(12) United States Patent
Obendiek

(10) Patent No.: US 7,331,624 B2
(45) Date of Patent: Feb. 19, 2008

(54) FOLDING TOP FOR A CABRIOLET VEHICLE

(75) Inventor: Klaus Obendiek, Passau (DE)

(73) Assignee: Edscha Cabrio-Dachsysteme GmbH, Hengersberg (DE)

( * ) Notice: Subject to any disclaimer, the term of this patent is extended or adjusted under 35 U.S.C. 154(b) by 174 days.

(21) Appl. No.: 10/511,054

(22) PCT Filed: Apr. 11, 2003

(86) PCT No.: PCT/DE03/01214

§ 371 (c)(1),
(2), (4) Date: Feb. 6, 2006

(87) PCT Pub. No.: WO03/086799

PCT Pub. Date: Oct. 23, 2003

(65) Prior Publication Data
US 2006/0202505 A1    Sep. 14, 2006

(30) Foreign Application Priority Data

| | | |
|---|---|---|
| Apr. 12, 2002 | (DE) | 102 16 401 |
| Apr. 24, 2002 | (DE) | 102 18 410 |
| Jul. 3, 2002 | (DE) | 102 29 808 |
| Sep. 16, 2002 | (DE) | 102 43 085 |

(51) Int. Cl.
*B60J 7/00* (2006.01)
(52) U.S. Cl. ............ 296/107.19; 296/107.01; 296/107.08

(58) Field of Classification Search ............ 296/107.01, 296/108, 107.08, 107.16, 107.19
See application file for complete search history.

(56) References Cited

U.S. PATENT DOCUMENTS

| | | | |
|---|---|---|---|
| 5,769,483 A | 6/1998 | Danzl et al. | 296/107 |
| 6,336,673 B1 | 1/2002 | Rothe et al. | 296/107.17 |
| 6,422,637 B1 | 7/2002 | Mac Farland | 296/107.15 |
| 6,425,620 B1 | 7/2002 | Schuett et al. | 296/107 |
| 6,425,621 B2 | 7/2002 | Miklosi et al. | 296/108 |
| 6,478,362 B2 | 11/2002 | Obendiek | 296/108 |
| 2001/0019213 A1 | 9/2001 | Eberle | 296/108 |

FOREIGN PATENT DOCUMENTS

DE        43 16 485        11/1994

(Continued)

*Primary Examiner*—Lori L. Lyjak
(74) *Attorney, Agent, or Firm*—Davidson, Davidson & Kappel, LLC

(57) ABSTRACT

A folding top for a cabriolet vehicle, that includes a first roof part which rests on a rear element of the vehicle, which can be opened, in the closed covering position, a second roof part which is pivotably mounted on the vehicle and is disposed in front of the first roof part in the direction of traffic when said second roof part is in a closed covering position, a third roof part which is disposed in front of the second roof part in the direction of traffic when said third roof part is in a closed covered position. The first roof part can be lifted from the rear element. A folding top with a particularly simple kinematic configuration is provided for allowing the third roof part to be moved over the second roof part.

36 Claims, 36 Drawing Sheets

FOREIGN PATENT DOCUMENTS

| | | |
|---|---|---|
| DE | 44 35 222 | 11/1995 |
| DE | 196 42 152 | 4/1998 |
| DE | 196 42 153 | 4/1998 |
| DE | 198 46 006 | 4/2000 |
| DE | 19932503 | 2/2001 |
| DE | 100 06 296 | 5/2001 |
| DE | 19964029 | 5/2001 |
| DE | 19962070 | 7/2001 |
| DE | 100 39 680 | 3/2002 |
| DE | 10119069 | 3/2003 |
| EP | 10292579 | 6/2002 |

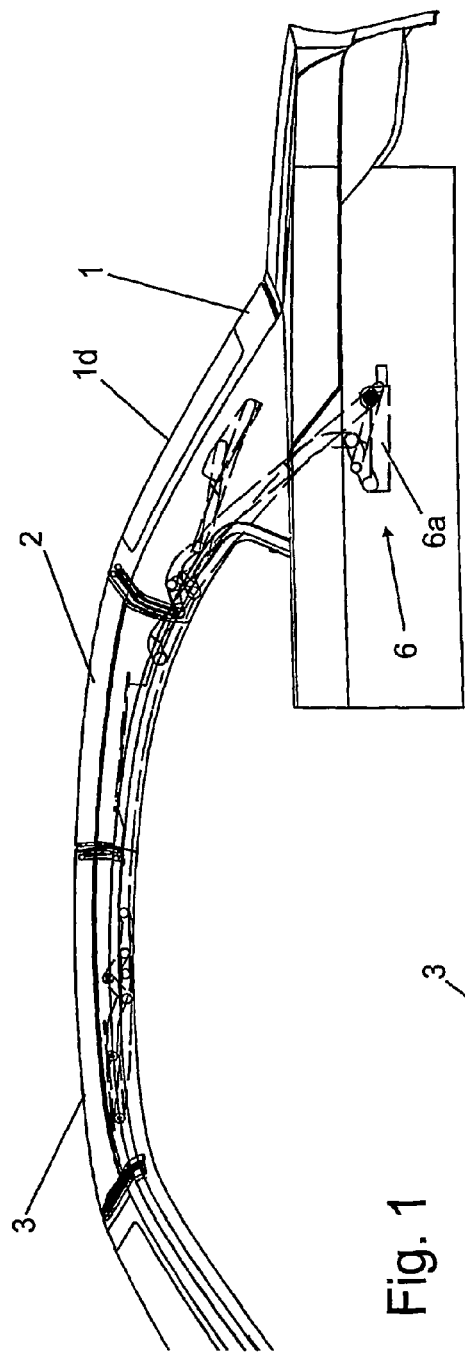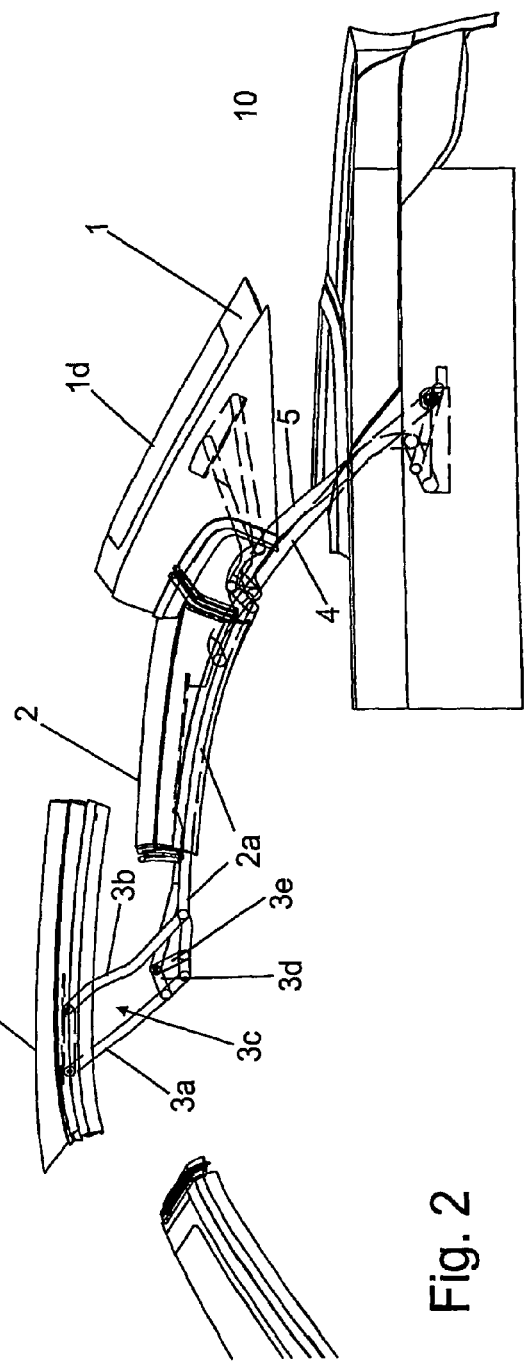

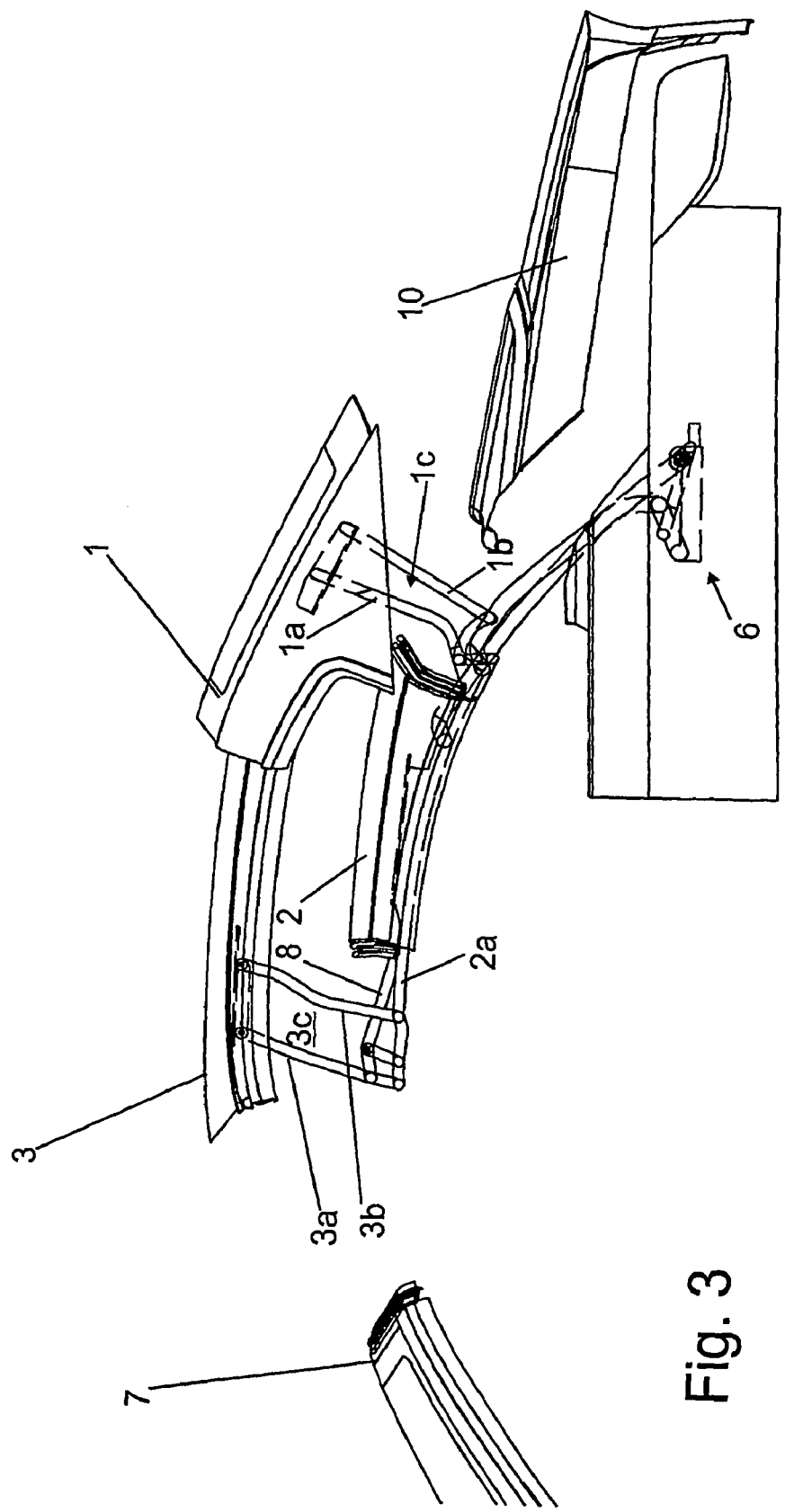

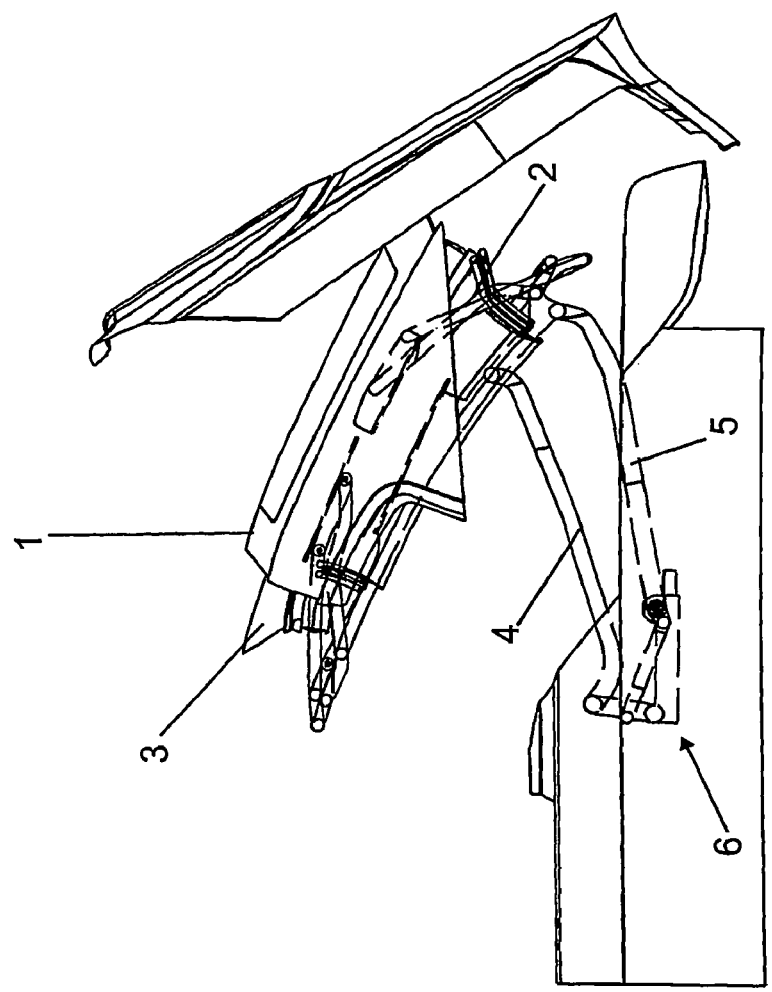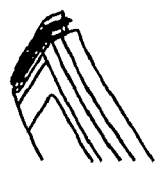
Fig. 5

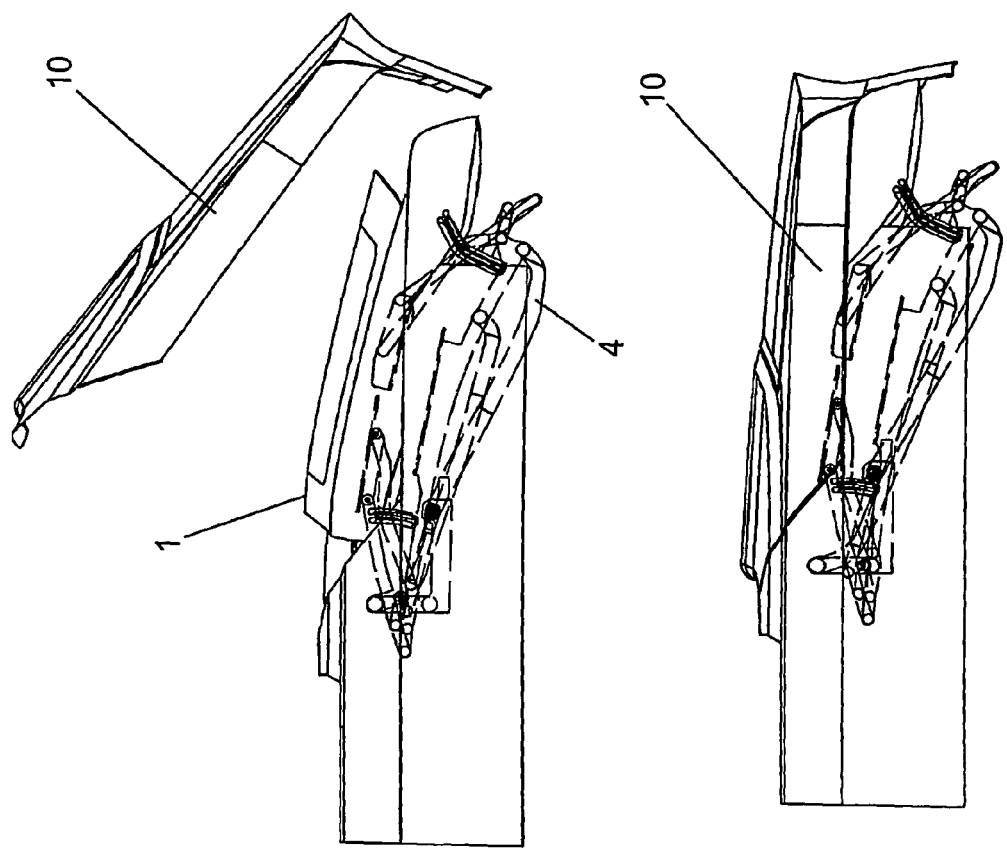
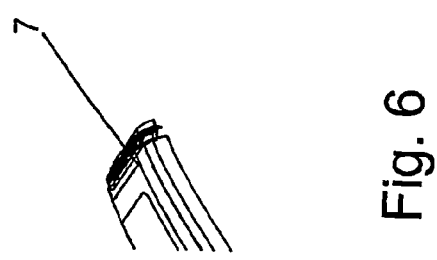
Fig. 6
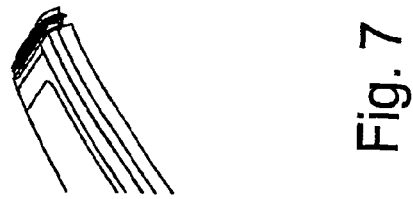
Fig. 7

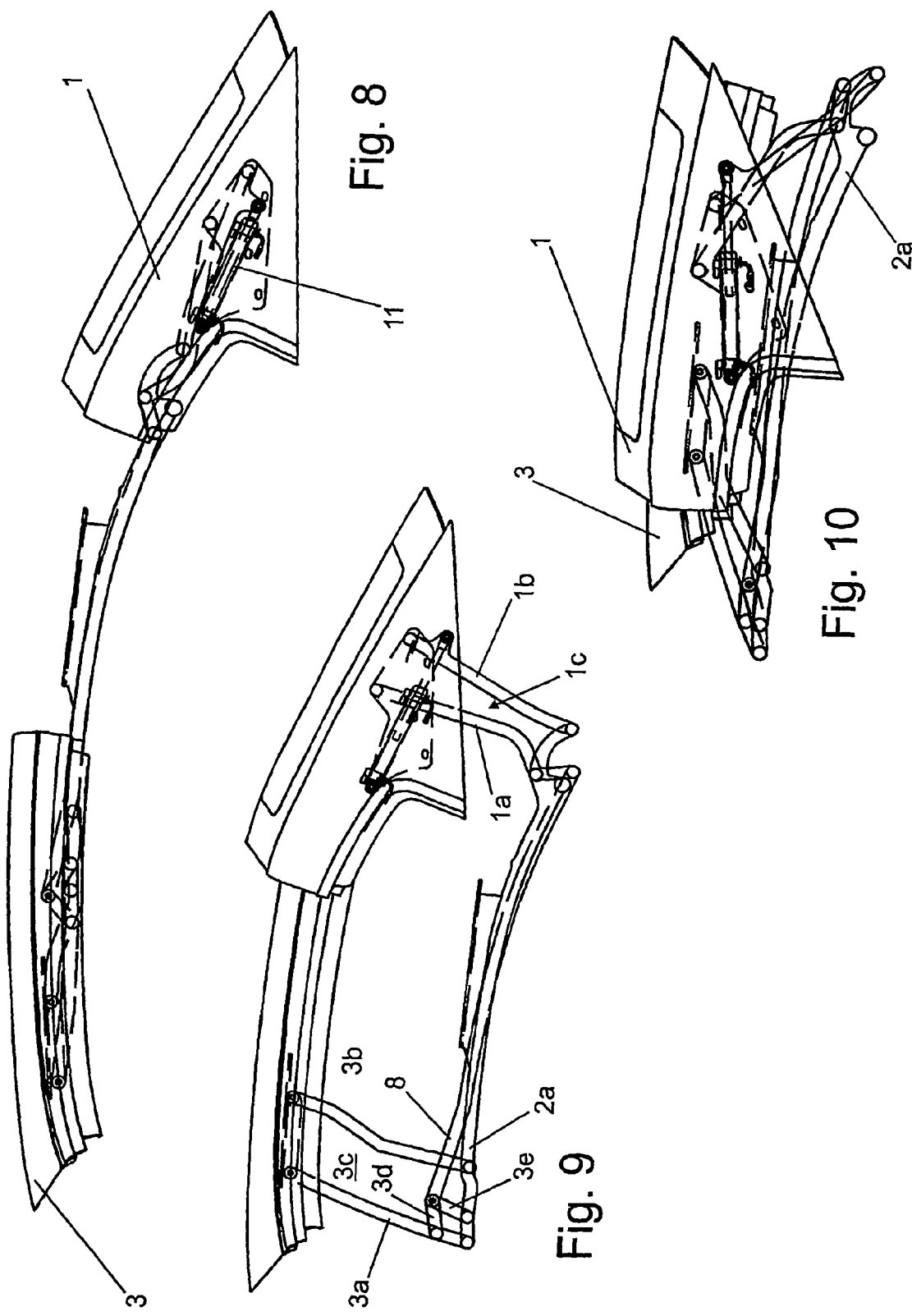

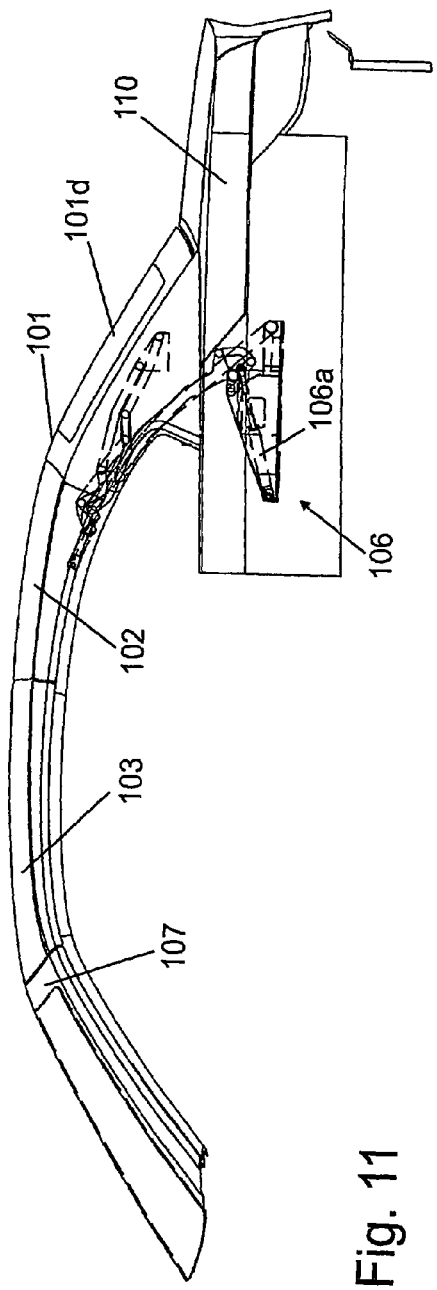
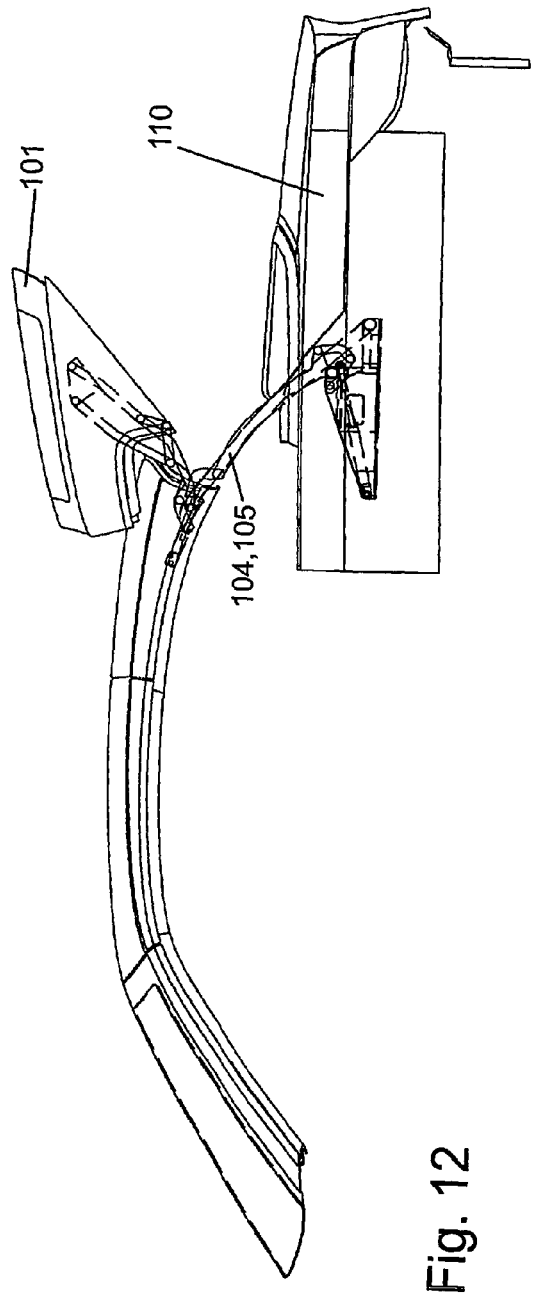
Fig. 11
Fig. 12

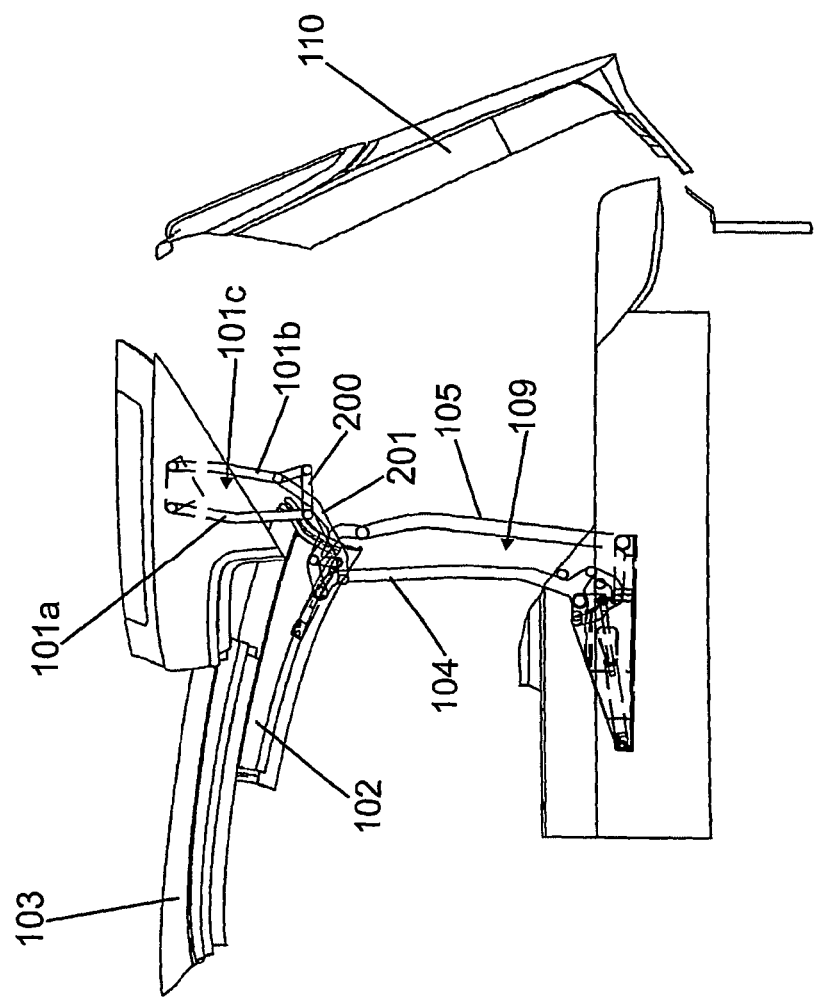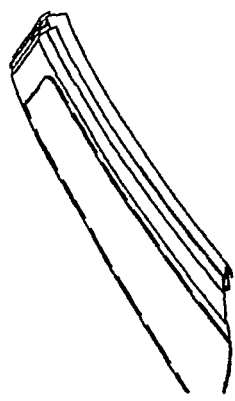
Fig. 15

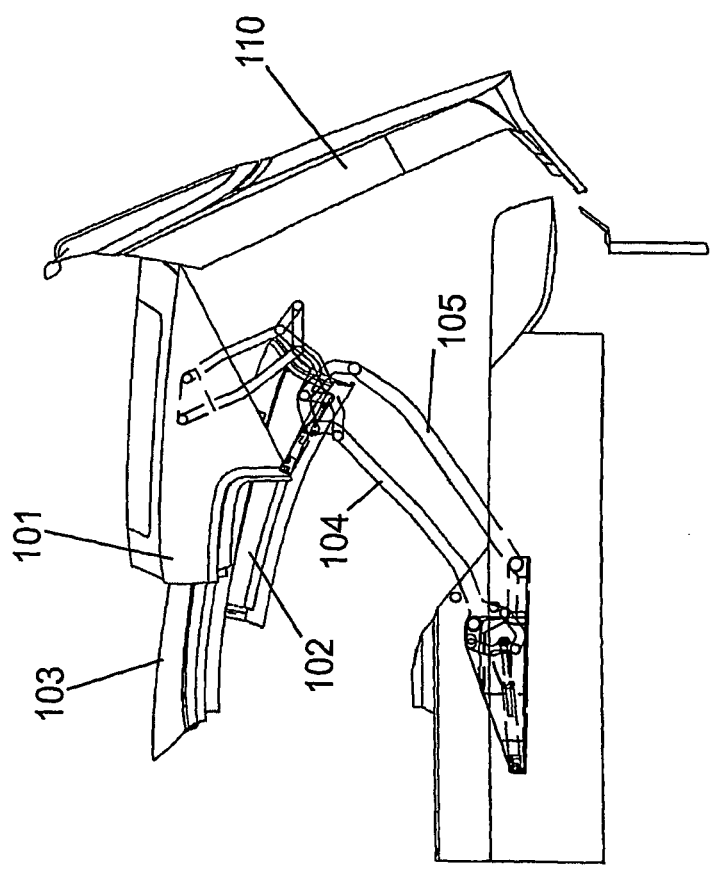
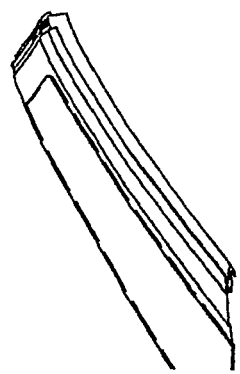
Fig. 16

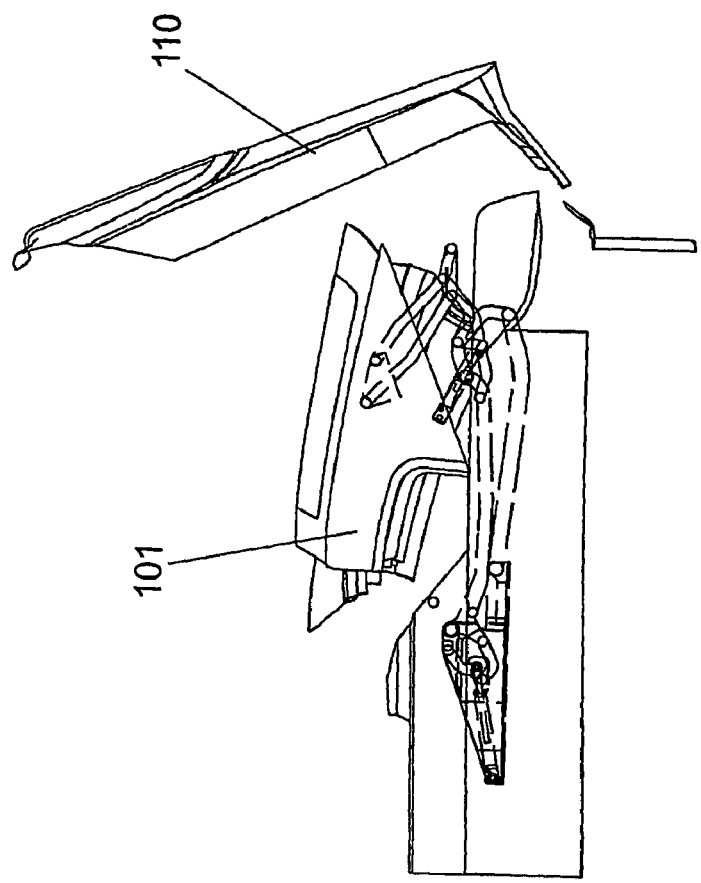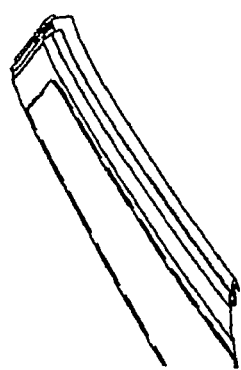
Fig. 17

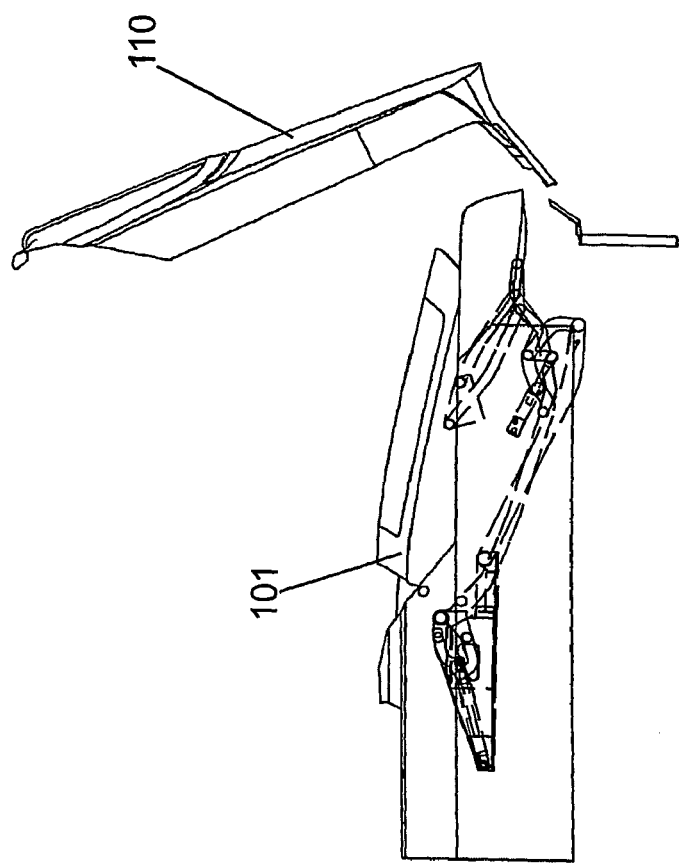
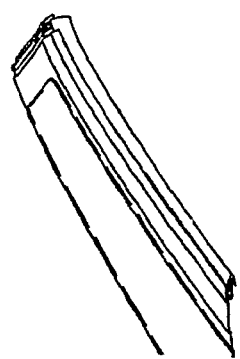
Fig. 18

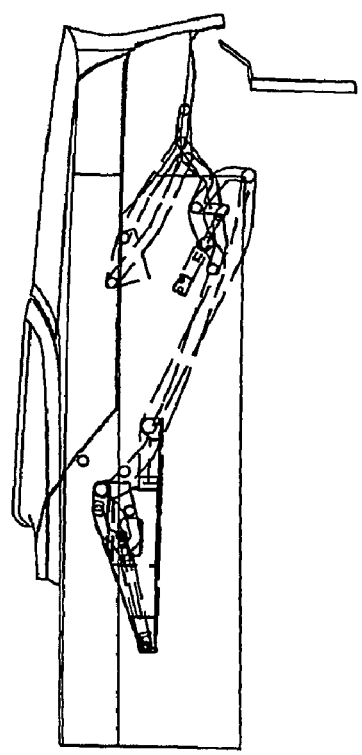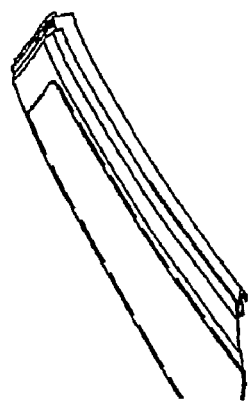
Fig. 19

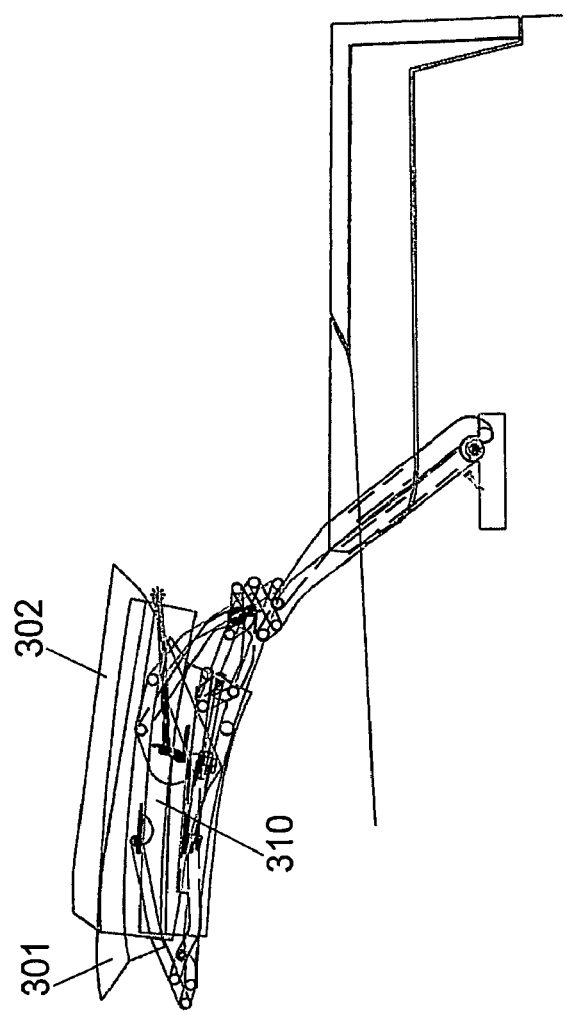
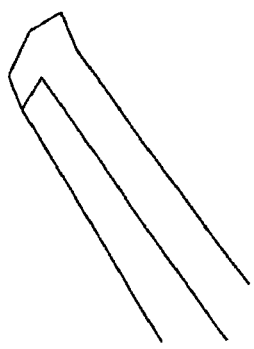
Fig. 36

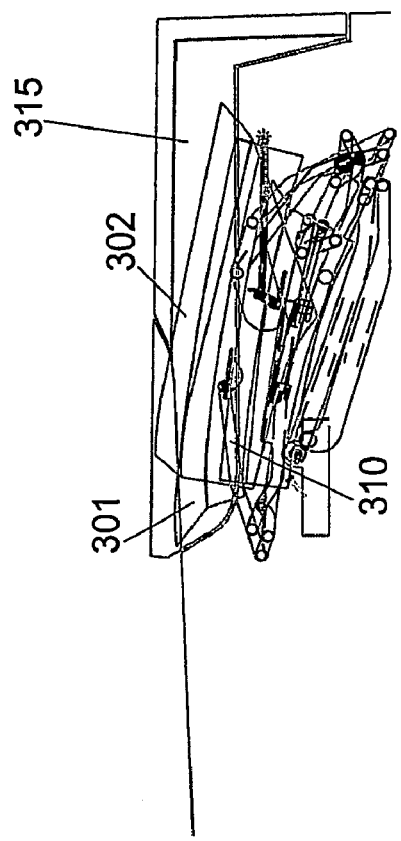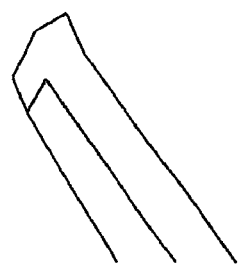
Fig. 38

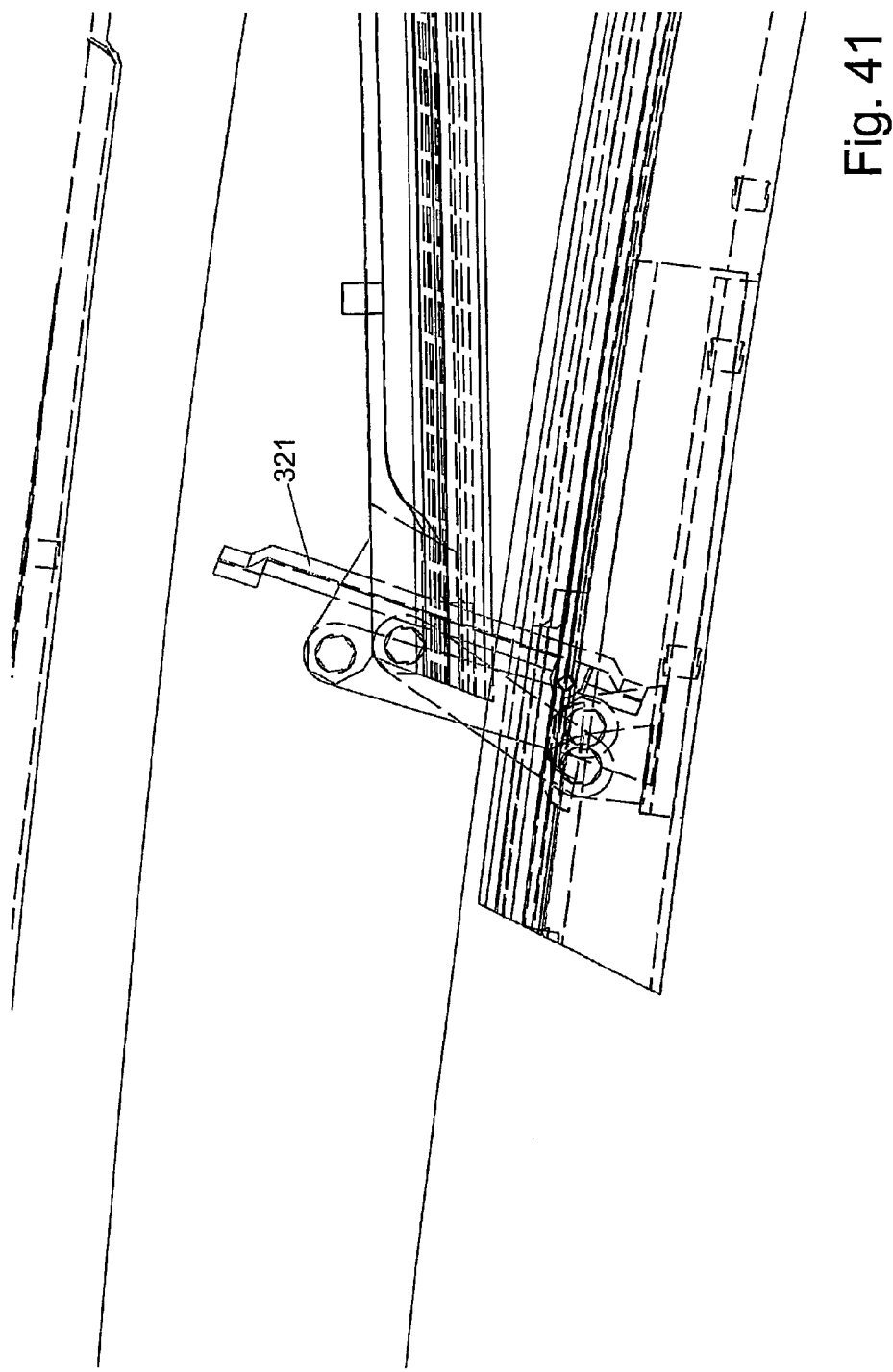

FOLDING TOP FOR A CABRIOLET VEHICLE

The invention relates to a folding top for a cabriolet vehicle.

BACKGROUND

The modern construction of folding cabriolet tops which comprise a plurality of solid roof parts, and can be stowed automatically in a rear region of the vehicle, is generally accompanied by the problem of a large number of parts moving in relation to one another. In order to release a stowage space for the folding top in the rear region during an opening movement, use is often made of a rear element which can be pivoted open counter to the direction of travel, a rear-window shelf arranged in front of the rear element being provided in a separately pivotable manner in order to achieve a collision-free movement sequence. The pivoting of the rear-window shelf here allows the rear roof part to move into the stowage space.

DE 44 35 222 C1 describes a folding top in which the rear roof part is pivoted open, in the first instance, in the direction of travel, whereupon the rear element can be opened counter to the direction of travel without a separately pivotable rear-window shelf necessarily having to be provided. The disadvantage with the solution presented here is that both the rear roof part and a central roof part, which adjoins the rear roof part in the direction of travel, are articulated separately in each case on the bodywork of the vehicle. In order not to collide with the central roof part during pivoting in the direction of travel, the articulations of the rear roof part comprise extendable hydraulic cylinders in order to raise the rear roof part over the central roof part. Such activation is not just complex and costly, but also susceptible to malfunctioning. In addition, it is necessary to have further means for fixing the rear roof part when the folding top is closed since the hydraulic cylinders which, at the same time, form bearing links of the roof part, are not invariable in their longitudinal direction. In order to prevent an even greater number of drive arrangements, it is proposed to lock the rear roof part to the central roof part in a position in which it has been pivoted over the central roof part. In respect of automated folding-top opening, however, it is also necessary to have high-outlay hydraulic or electromechanical means for this purpose.

DE 100 06 296 C1 describes a three-part hard-shell top for a cabriolet vehicle in which a central roof part is connected to a bodywork of the vehicle by means of a link mechanism, both a front roof part and a rear roof part being mounted on the central roof part in each case via link mechanisms, and it being possible for the front roof part to be moved over the central roof part and for the rear roof part to be moved beneath the front roof part and over the central roof part. Such an arrangement provides for unfavorable stacking of the roof parts and, if at all, can only be realized in the manner presented, with essentially planar roof parts. If, for example, the rear roof part comprises C-pillars of the vehicle, or if the roof parts are to be stacked in a different order, then the technical realization quickly comes up against limitations, at least when as large a proportion of the roof-part movements as possible take place in a positively controlled manner in relation to one another.

SUMMARY OF THE INVENTION

An object of the invention is to improve a folding top mentioned in the introduction to the extent that the kinematics has a particularly simple layout.

The present invention provides a folding top for a cabriolet vehicle that includes a first roof part resting upon an openable rear element of the vehicle in a closed state of the folding top and capable of being raised up from the rear element; a second roof part mounted pivotably on the vehicle and disposed in front of the first roof part relative to a direction of travel in the closed state of the folding top; and a third roof part including a hard shell part extending transversely to the direction of travel over an entire width of the vehicle, the third roof top being disposed in front of the second roof part in the closed state of the folding top, wherein the first roof part is disposed above the second roof part in an open state of the folding top and wherein the third roof part is displaceable to a position over the second roof part. By the possibility of displacing the third roof part over the second roof part it is advantageously achieved that a folding top according to the invention can comprise three complete roof parts, a particularly space-saving stacking sequence of the roof parts being made possible.

The present invention also provides a folding top for a cabriolet vehicle that includes a first roof part resting upon an openable rear element of the vehicle in a closed state of the folding top and capable of being raised up from the rear element; a second roof part mounted pivotably on the vehicle and disposed in front of the first roof part relative to a direction of travel in the closed state of the folding top; a third roof part disposed in front of the second roof part in the closed state of the folding top, wherein the first roof part is disposed above the second roof part in an open state of the folding top; and a positive control means connecting the third roof part and the first roof part. By the possibility of connecting the third roof part and the first roof part to one another by a positive control means it is advantageously achieved that the necessary number of separate drive devices is reduced.

The present invention also provides a folding top for a cabriolet vehicle that includes a first roof part resting upon an openable rear element of the vehicle in a closed state of the folding top and capable of being raised up from the rear element; a second roof part mounted pivotably on the vehicle and disposed in front of the first roof part relative to a direction of travel in the closed state of the folding top, wherein the first roof part is mounted in a movable manner on the second roof part; and a third roof part disposed in front of the second roof part in the closed state of the folding top, wherein the first roof part is disposed above the second roof part in an open state of the folding top. As a result of the first roof part being mounted in a movable manner according to the invention on the second roof part, the first roof part can easily be pivoted over the second roof part in the direction of travel without there being any need for special measures, for example links designed as hydraulic cylinders, for the purpose of raising the first roof part.

The features of discussed above can preferably also be combined with one another in each case in full or in pairs as desired, in which case the respective advantages are supplemented.

A folding top according to the invention additionally achieves the situation where an opening movement of the second roof part or of the third roof part can begin before the first roof part has been moved completely over the second roof part, with the result that a particularly time-saving opening movement can be realized overall.

In the case of a folding top according to the invention, when the folding top is in an open position, the third roof part is advantageously arranged above the second roof part and the first roof part is arranged above the third roof part. This achieves a particularly space-saving stacking sequence of three roof parts of a folding top according to the invention.

The rear element can advantageously be pivoted open counter to the direction of travel, with the result that a rear stowage can be released in a straightforward and known manner. As an alternative, however, it is also possible for the rear element to be opened by some other type of movement, for example by being displaced or swung open laterally, since, once the first roof part has been raised up from the rear element, the rear element can, largely, move freely.

The first roof part is advantageously raised up from the rear element in a first stage of a folding-top opening movement. It is thus possible, for example, for the operations of the roof parts forming a stack and of the rear element pivoting open to take place simultaneously, as a result of which it is possible for the duration of the folding-top opening movement to be kept short overall.

The first roof part, further advantageously, rests on the rear element in a sealing manner from above when the folding top is closed. This allows particularly straightforward sealing of the first roof part in relation to the vehicle and/or the rear element.

The third roof part, further advantageously, can be pivoted essentially parallel over the second roof part, this allowing a straightforward technical realization of the movement of the third roof part in relation to the second roof part, for example by means of a four-bar mechanism or of a linear guide.

The third roof part, further advantageously, can be secured in a releasable manner on a windshield frame of the vehicle when the folding top is closed, this making it possible to form a particularly large folding cabriolet top which even covers over sedans with four or more seats.

In a first preferred embodiment of a folding top according to the invention, the first roof part is articulated, by means of a first roof-part link and of a second roof-part link, on a coupling link which is fixed to the second roof part, the first roof part, the first roof-part link, the second roof-part link and the coupling link forming a roof-part four-bar mechanism. By virtue of this articulation of the first roof part on the second roof part by means of a four-bar mechanism, vertical displacement of the first roof part can be achieved particularly straightforwardly, as early as a first movement stage, when it is pivoted open in the direction of travel.

It is particularly preferred here if the roof-part four-bar mechanism can be pivoted in a driven manner by means of a drive device in relation to the second roof part, fully automatic opening and closing of the folding top being made possible as a result.

It is particularly preferred here if the third roof part is connected in an articulated manner to the coupling link via a first front link and a second front link, with the result that a front four-bar mechanism is formed by the coupling link, the first front link, the second front link and the third roof part, it thus being possible for the third roof part to be straightforwardly incorporated in a positively controlled opening or closing movement of the folding top according to the invention.

A control link particularly preferably connects the front four-bar mechanism and the roof-part four-bar mechanism to one another in an articulated manner, a first positively controlled link chain being formed by the front four-bar mechanism, the roof-part four-bar mechanism and the control link. As a result, the rear, first roof part and the front, third roof part can be pivoted in relation to one another, and relative to the second, central roof part, by means of a common drive device. It is preferred here if the first positively controlled link chain forces the first roof part and the third roof part to move in opposite directions in each case, with the result that the first roof part and the third roof part are located together above the second roof part to form a compact stack. This stack formation is particularly preferably configured such that the third roof part ends up located beneath the first roof part and above the second roof part when the folding top is in a stowed position. A particularly small amount of space is taken up with this sequence of arranging the stowed roof parts since the third, front roof part generally has the lowest overall height of the three roof parts and can thus be accommodated to particularly good effect in a space which remains between the first roof part and the second roof part. In this grouped position, the roof parts are oriented in the same way in each case with curvature being oriented in the same direction.

A first main link and a second main link is particularly preferably provided, the first main link and the second main link being connected in an articulated manner in each case to a bodywork-mounted main-bearing unit, the second roof part connecting the first main link and the second main link in an articulated manner to give a main-link mechanism, in particular a main four-bar mechanism, which forms a second positively controlled link chain. In this way, the attachment of the folding top as a whole to the bodywork merely comprises the two main links. During an opening movement of the folding top, in the first instance, a stack of the three roof parts is thus advantageously formed, whereupon, as a result of the main four-bar mechanism being pivoted, this stack can easily be pivoted into a rear region of the vehicle for stowage purposes. The main four-bar mechanism can particularly preferably be pivoted for driving action here by means of a given force-introduction unit. From a system-analysis viewpoint, the folding top provided is thus particularly preferably one in which two separately drivable positively controlled link chains are present, the first link chain being mounted on the second link chain and only the second link chain being connected directly to the vehicle bodywork. This results, inter alia, in the advantage that the articulation of the folding top as a whole on the bodywork of the vehicle may be provided in a small area, this making it possible to design the articulation region as a modular main bearing of the folding top.

A rear element which can be pivoted open counter to the direction of travel is particularly preferably provided, the first roof part resting on the rear element with sealing action when the folding top is closed. This advantageously means that it is possible to dispense with a separately pivotable rear-window shelf, with the result that the rear-window shelf can just be designed as a fixed, front region of the rear element.

The first roof part particularly preferably comprises a solid rear window.

In a second preferred embodiment of a folding top according to the invention, the first roof part is pivoted open in the direction of travel, in the first instance, about an axis of rotation, the axis of rotation being arranged in a rear end region of the second roof part. This advantageously achieves a particularly pleasing folding top opening-movement sequence.

A drivable base link is preferably mounted in a movable manner on the second roof part, the base link forming the base of a roof-part four-bar mechanism, a first roof-part link and a second roof-part link being provided in addition, and the first roof part forming the connecting rod of the roof-part four-bar mechanism. In addition, a control link connects one of the roof-part links in an articulated manner to a main link of the folding top. This advantageously achieves the situation where both the roof-part four-bar mechanism is activated separately via the drivable base link and the roof-part four-bar mechanism, and thus the first roof part, is incorporated in a positively controlled manner in the further link chain of the folding top.

A third roof part which can be secured in a releasable manner on a windshield frame of the vehicle when the folding top is closed is particularly preferably provided, the third roof part being mounted on the second roof part such that it can be moved via a sliding guide. This easily makes it possible for a folding top according to the invention also to be capable of being used for particularly large passenger compartments.

In a further preferred embodiment of a folding top according to the invention a mechanical control device is advantageously provided in a positively controlled connection between the first, in particular rear roof part and the third, in particular front roof part, with the result, that on the one hand, the roof parts can be moved simultaneously by means of just a single drive device and, on the other hand, the mechanical control device allows coordination of the movement of the roof parts, in particular a temporal sequential or quasi-sequential sequence of the individual movements without any additional drives being required. In particular, doing away with additional drives, in addition to reducing costs, ensures that the mechanics of the folding top as a whole are less susceptible to malfunctioning.

The control device preferably comprises a rotary link. A single force-introduction unit particularly preferably drives the rotary link, and the rotary link is connected to the third roof part via a first linkage and to the first roof part via a second linkage. It is thus possible to transmit a given way of the force-introduction unit in accordance with the principle of a projected circular movement onto the first and the second linkages, with a phase shift in each case. Starting from a closed folding-top position, it is thus possible to drive, in the first instance, the first linkage and thus the third roof part, whereas the second linkage, and thus the first roof part, is noticeably driven only once the rotary link has been rotated. If the angular position alpha of the rotary link in the starting position is named zero degrees, then, in a first approximation, it is possible for a factor which can be achieved in the transmission of the displacement for the first linkage to be proportional to sine (alpha+delta) and for the factor for the transmission of the displacement of the second linkage to be proportional to sine (alpha+delta+phi), where the phase shift phi is preferably in the order of magnitude of ninety degrees and delta is a constant, predetermined angle of origin. Delta can preferably differ from zero and, in particular, be somewhat smaller than zero, in order that there is a large transmission factor for the first linkage for as long as possible at the start of the movement operation.

The first roof part is particularly preferably a rear roof part, and the third roof part is a front roof part, of the folding top, a second, central roof part being arranged between the first roof part and the third roof part when the folding top is closed. It is preferable here for the third roof part to be connected to the central roof part via a front four-bar mechanism, and for the first roof part to be connected to the central roof part via a rear four-bar mechanism. In particular in the case of the first roof part moving in the opposite direction in relation to the third roof part here, this movement, in addition, being particularly extensive as a result of the four-bar mechanisms, the fact that the invention provides the mechanical control device is advantageous since this makes it possible to achieve a particularly large degree of freedom in the dimensioning of the roof parts and the design of the paths of motion of the roof parts.

The central roof part may advantageously be connected to the bodywork of the vehicle via a main-link mechanism, in particular a main four-bar mechanism, with the result that, during or after pivoting of the first and of the third roof part over the central roof part, it is possible for the roof parts arranged in a stack to be pivoted together into a rear stowage region by means of the main-link mechanism.

At least one link of the front four-bar mechanism particularly advantageously is arranged adjacent the outside of the central roof part when the folding top is closed. This advantageously achieves the situation, in respect of space-saving stowage of the open folding top, where a link which bears the means for activating the third, front roof part may be of particularly short configuration, since the outside link of the front four-bar mechanism allows the front four-bar mechanism to be largely set back relative to the central roof part. In particular, however, this provision of the outside link also results in very advantageous use of the control device, since the outside link ultimately gives rise to particularly space-consuming pivoting of the first roof part which, without the control device, would, in the case of a preferred folding top, result in a collision with the third, rear roof part.

The third roof part of a folding cabriolet-vehicle top according to the invention is preferably a hard shell part which extends transversely to the direction of travel over the entire width of the vehicle. It is thus possible to dispense with the high-outlay subdivision of the third roof part, for example into a central sliding roof and lateral frame parts which can be pivoted transversely to the direction of travel, with the result that a folding top according to the invention has fewer joints and more straightforward mechanics. It is quite possible here, if desired, for a sliding roof which is known per se from the prior art to be integrated in the surface of the third roof part.

Further advantages and features of the folding top according to the invention can be gathered from the exemplary embodiments described hereinbelow and from the claims.

BRIEF DESCRIPTION OF THE DRAWINGS

Three preferred exemplary embodiments of a folding top according to the invention are described hereinbelow and explained in more detail with reference to the attached drawings, in which:

FIG. 1 shows a schematic view, from the side, of a first exemplary embodiment of a folding top according to the invention in a closed state, FIG. 2 shows the folding top from FIG. 1 in a first step of a folding-top opening movement, FIG. 3 shows the folding top from FIG. 1 in a second step of a folding-top opening movement, FIG. 5 shows the folding top from FIG. 1 in a fourth step of a folding-top opening movement, FIG. 6 shows the folding top from FIG. 1 in a fully open state with the rear lid open, FIG. 7 shows the folding top from FIG. 6 with the rear lid closed, FIG. 8 shows a partial view of the folding top from FIG. 1, in which, in order for the mechanics to be seen more clearly, the second roof part has not been illustrated, and a drive unit of the first roof part is shown in detail, FIG. 9 shows the folding top from FIG. 8 in a first step of a folding-top opening movement, FIG. 10 shows the folding top from FIG. 8 in a second step of a folding-top opening movement, FIG. 11 shows a schematic view, from the side, of a second exemplary embodiment of a folding top according to the invention in a closed state, FIG. 12 shows the folding top from FIG. 11 in a first step of a folding-top opening movement, FIG. 15 shows the folding top from FIG. 11 in a fourth step of a folding-top opening movement, FIG. 16 shows the folding top from FIG. 11 in a fifth step of a folding-top opening movement, FIG. 17 shows the folding top from FIG. 11 in a sixth step of a folding-top opening movement, FIG. 18 shows the folding top from FIG. 11 in a fully open state, with the rear lid open, FIG. 19 shows the folding top from FIG. 18 with the rear lid closed, FIG. 36 shows a lateral overall view of the folding top from FIG. 33, FIG. 38 shows the folding top from FIG. 36 in a state in which it has been opened fully and stowed in a rear region of the vehicle, FIG. 41 shows the view, in detail form, from FIG. 39 in a fully open position, with the outside link pivoted to the maximum extent.

DETAILED DESCRIPTION

Figure 4:
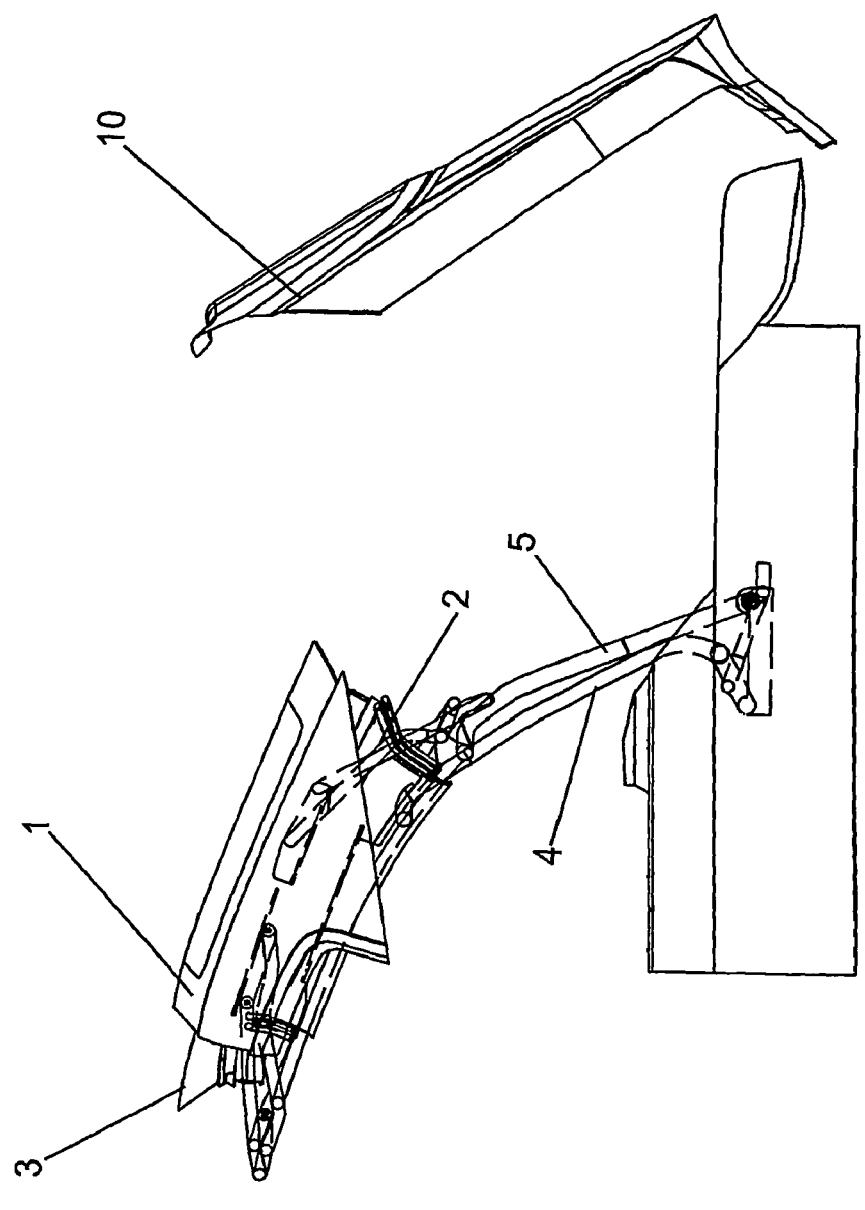
FIG. 4 shows the folding top from FIG. 1 in a third step of a folding-top opening movement.
Figure 13:
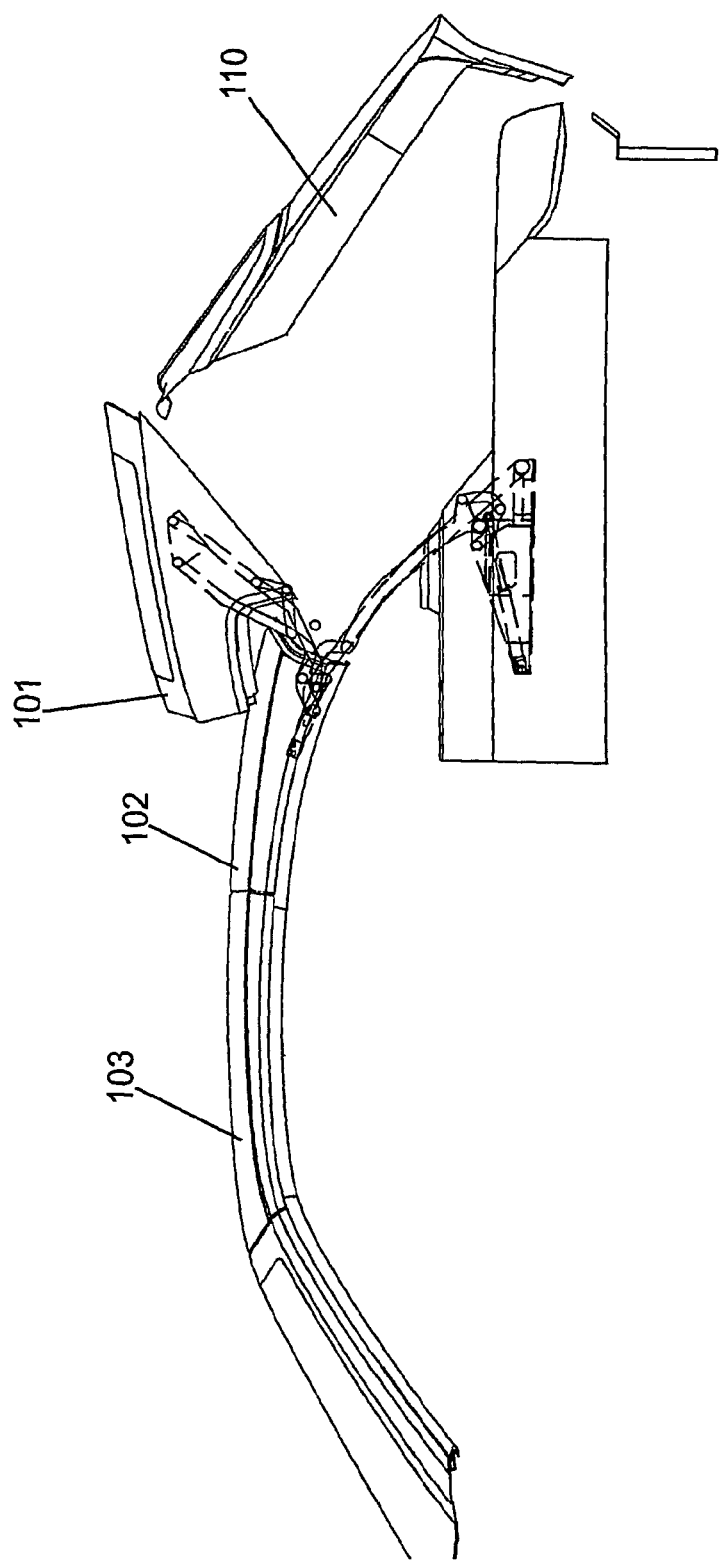
FIG. 13 shows the folding top from FIG. 11 in a second step of a folding-top opening movement.
Figure 14:
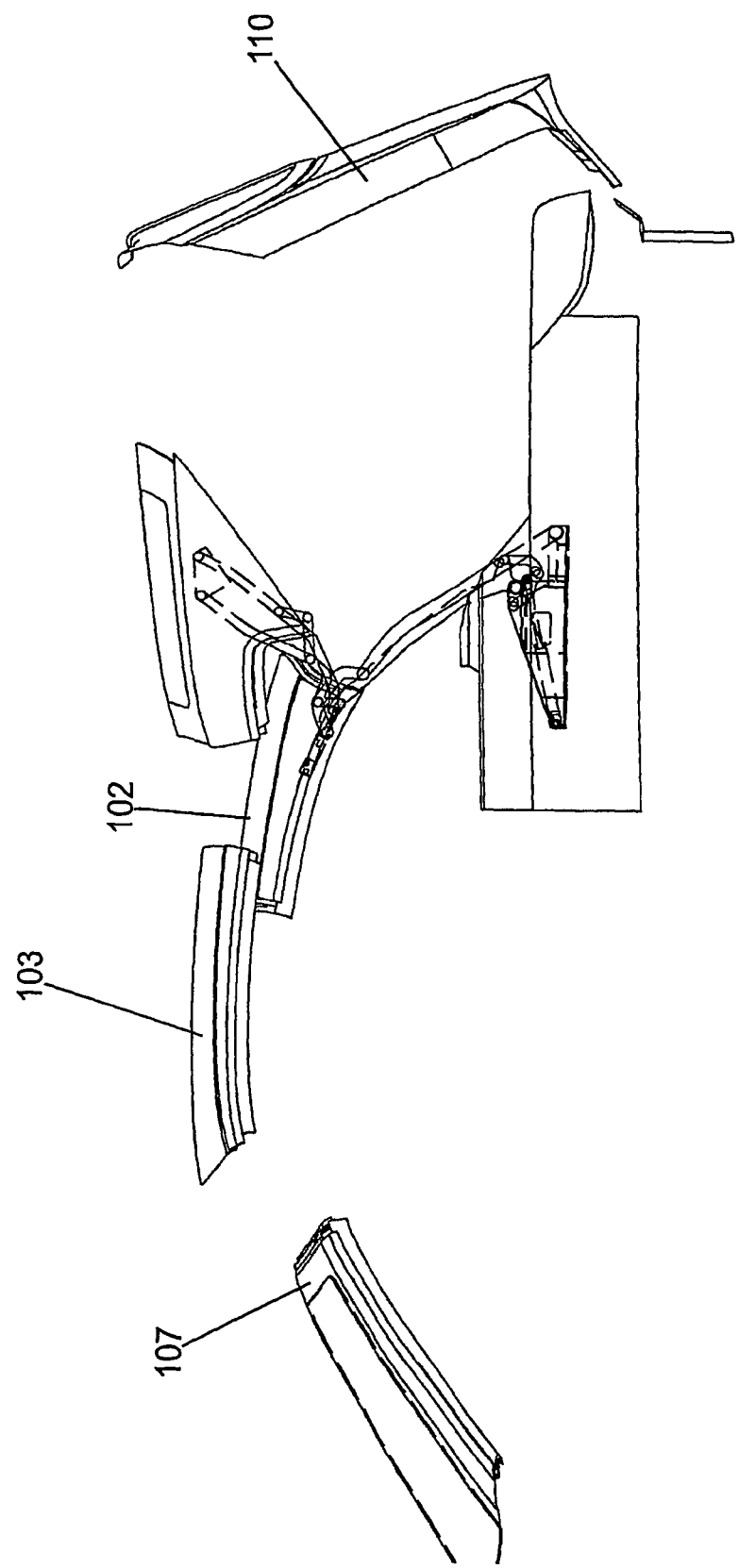
FIG. 14 shows the folding top from FIG. 11 in a third step of a folding-top opening movement.
Figure 20:
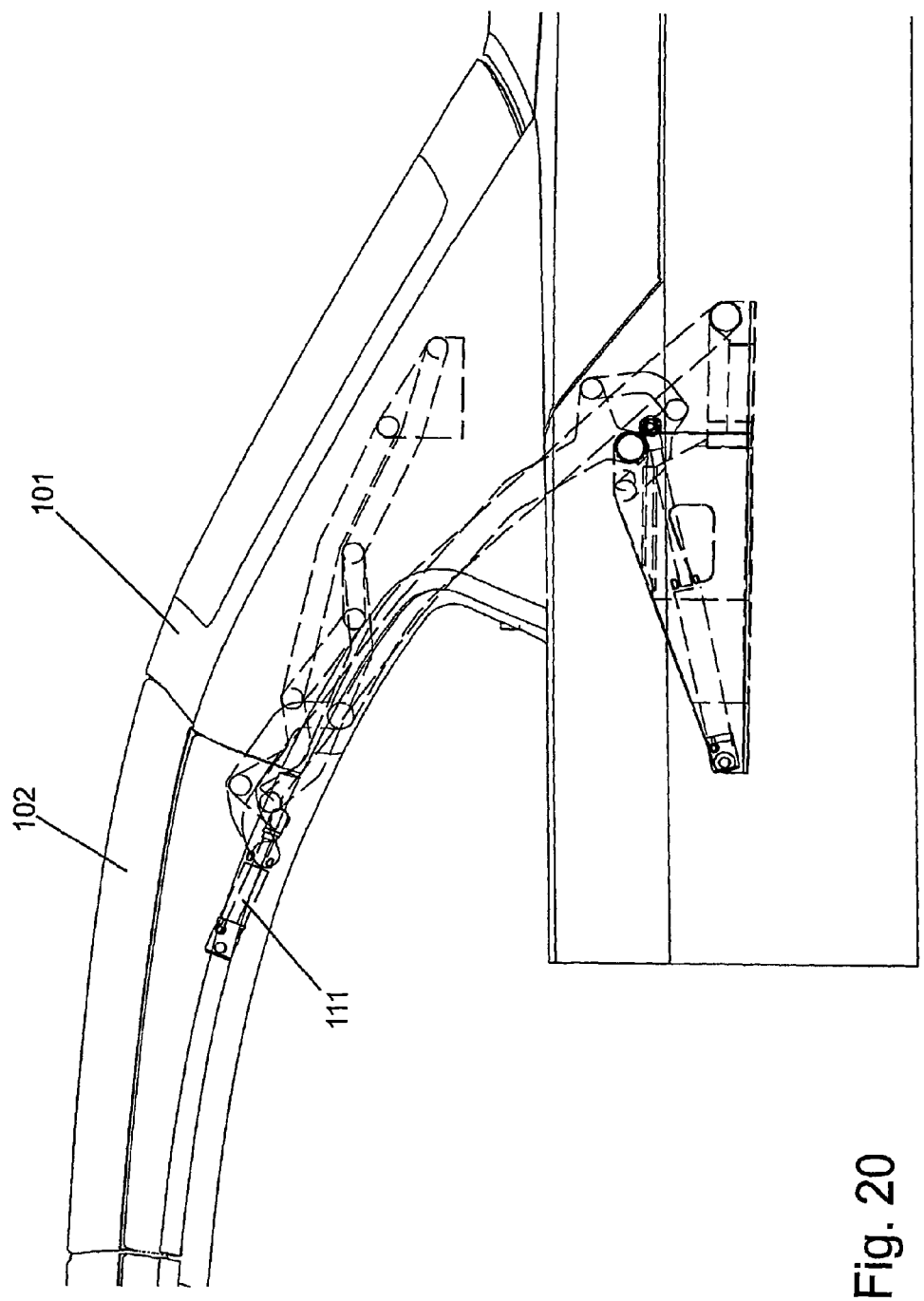
FIG. 20 shows a partial view of the folding top from FIG. 11.

As FIG. 1 shows, a first preferred exemplary embodiment of a folding top according to the invention comprises a first, rear roof part 1, a second, central roof part 2 and a third, front roof part 3, these being designed as solid shell parts and completely covering over a passenger compartment of the vehicle when the folding top is closed. The third roof part 3 here is secured in a releasable manner on a windshield frame 7 of the vehicle. The first roof part 1 comprises C-pillars of the vehicle and a solid rear window 1d.

Formed at the rear, and beneath the first roof part 1, is a rear element 10 which can be pivoted open counter to the direction of travel (see also FIGS. 2 to 7).

The second roof part 2 comprises a solid shell part and a coupling link 2a which is fixed to the shell part and projects beyond the shell part both at the front and at the rear. A first main link 4 and a second main link 5 are connected in an articulated manner in each case, at one end, to the coupling link 2a and, at the other end, to a main-bearing unit 6 which is secured on the bodywork of the vehicle, with the result that a main four-bar mechanism 9 is formed by the coupling link 2a, the main links 4, 5 and the main-bearing unit 6. A force-introduction unit 6a designed as a rotary hydraulic cylinder is provided in the region of the main-bearing unit 6, with the result that the main four-bar mechanism 9 can be pivoted for driving action by means of the force-introduction unit 6a.

As FIGS. 8 to 10, in particular, also show, the first roof part is connected to the coupling link 2a by means of a first roof-part link 1a and of a second roof-part link 1b, with the result that a roof-part four-bar mechanism 1c is formed overall by the coupling link 2a, the two roof-part links 1a, 1b and the first roof part 1. Drivable pivoting of the roof-part four-bar mechanism 1c is made possible here in that a drive device 11 designed as a hydraulic linear cylinder is supported, on the one hand, on the first roof-part link 1a and, on the other hand, on the second roof-part link 1b. Extending and retracting the cylinder thus changes the spacing between the roof-part links 1a, 1b, which correspondingly causes the roof-part four-bar mechanism to pivot.

In a similar manner, the third roof part 3 is connected in an articulated manner to the coupling link 2a in each case by means of a first front link 3a and of a second front link 3b, the front links being coupled to one another at the other end via the third roof part 3, with the result that the front links 3a, 3b, the coupling link 2a and the third roof part 3 form a front four-bar mechanism 3c.

The front four-bar mechanism 3c and the roof part four-bar mechanism 1c are coupled to one another via a control link 8. The control link 8 is connected here, at one end, to an extension of the first roof-part link 1*a*. At the other end, the control link is connected to two intermediate links 3*d*, 3*e* at an articulation, one intermediate link 3*d* being connected to the first front link 3*a* and the other intermediate link 3*e* being connected to the coupling link 2*a*. This indirect activation of the front four-bar mechanism 3*c* via the intermediate links 3*d*, 3*e* advantageously allows a particularly large pivoting angle of the front four-bar mechanism 3*c*.

The front four-bar mechanism 3*c*, the roof-part four-bar mechanism 1*c* and the intermediate links 3*d*, 3*e*, the control link 8 and the coupling link 2*a* together form a first positively controlled link chain.

The previously described main four-bar mechanism 9 is regarded as a second positively controlled link chain. The previously described first positively controlled link chain may thus be regarded as being positioned on the second positively controlled link chain, in this case the coupling link 2*a*, as the only common element, constituting a connection of the two link chains.

Depending on the configuration of the main-bearing unit, it is also possible for the main four-bar mechanism 9 to be configured as a more complex link chain, for example as a seven-bar mechanism, if the bodywork of the vehicle is regarded as a link. The view that the main-bearing unit 9 constitutes a link of possibly variable length and position in space has thus been selected here, with the result that the main-bearing unit 9, the two main links 4, 5 and the coupling link 2*a* always form a four-bar mechanism with, if appropriate, a variable-length link.

The invention functions, then, as follows:

Starting from the closed folding top position according to FIGS. 1 and 8, in the first instance, the first roof part 1 and the third roof part 3 are moved by means of the drive device 11, the first roof part 1 and the third roof part 3 pivoting commonly over the second roof part 2, in which case the first roof part is arranged as the uppermost part, the third roof part is arranged as the central part and the second roof part is arranged as the bottom part, of a group comprising three roof parts oriented in the same direction (see FIGS. 1 to 4 and FIGS. 8 to 10).

As soon as the first roof part 1 has been pivoted sufficiently far forward, the rear element 10 is pivoted open counter to the direction of travel in order to release a stowage space for the folding top in a rear region of the vehicle (see FIGS. 3 and 4).

In a further step of a folding-top opening movement, the previously described stack made up of the three roof parts can then be lowered into the rear region of the vehicle by means of the second positively controlled link chain, which is the driven main four-bar mechanism 9, whereupon the rear element is closed again (see FIGS. 5 to 7). The rear element, when the folding top is both open and closed, directly adjoins a rear boundary of the passenger compartment, with the result that it is possible to dispense with a separately movable rear-window shelf.

The closing movement of the folding top takes place correspondingly in kinematic reverse.

A second exemplary embodiment of a folding top according to the invention is described hereinbelow:

As is shown in FIGS. 11 to 24, the folding top likewise comprises three roof parts 101, 102, 103. The reference numbers of the second exemplary embodiment have been selected, overall, in relation to the first exemplary embodiment such that comparable or analogous components each have the numeral 100 added to them. The folding top thus likewise comprises a first main link 104 and a second main link 105, which are constituent parts of a main four-bar mechanism 109.

In contrast to the first exemplary embodiment, the third, front roof part 103 is connected to the second, central roof part 102 via a sliding guide. There is thus no positively controlled connection between the third roof part 103 and the first roof part 101.

The first roof part 101 is likewise mounted in a pivotable manner on the second roof part 102. The mounting and activation of the first roof part is illustrated in detail, and on an enlarged scale, in different stages of a folding-top opening movement in FIGS. 20 to 24.

In this case, the first roof part 101 is connected to a base link 200 such that it can be pivoted via a first roof-part link 101*a* and a second roof-part link 101*b*, with the result that the roof-part links 101*a*, 101*b*, the first roof part 101 and the base link 200 together form a roof-part four-bar mechanism 101*c*.

The base link 200, in addition, is mounted in a rotatable manner on the second roof part 102, more specifically on a coupling link 102*a* which bears the second roof part 102. The base link 200 can be rotated for driving action in said mount via a drive device 111, which is designed as a hydraulic cylinder and is supported against the second roof part 102.

A control link 201 connects the second roof-part link 101*b* to the first main link 104. This connection ensures that the roof-part four-bar mechanism 101*c*, rather than being capable of being moved freely, is subject to positive control overall. In addition, the position of the first roof part 101 relative to the second roof part 102 is thus determined by two parameters: on the one hand, it is possible to change the position via the drive device 111 by the base link 200 being moved in relation to the coupling link 102*a* or the second roof part 102, which is connected rigidly to the coupling link. On the other hand, a movement of the main four-bar mechanism 109 results in a movement of the first main link 104 relative to the coupling link 102*a*. As a result, the roof-part four-bar mechanism 101*c* is also pivoted by means of the control link 201.

A particular way of providing for a folding-top opening movement can be realized by this double activation of the first roof part 101, as is documented in a multiplicity of intermediate positions in FIGS. 11 to 19:

In the first instance, starting from the closed position of the folding top according to FIG. 11, the drive device 111 is actuated, with the result that the base link 200 is moved for driving action. The main four-bar mechanism 109 thus remains unchanged in the first instance. The driven movement of the base link 200 is a rotation of the base link 200 about a rotary articulation 200*a*, at which the base link 200 is articulated on the coupling link 102*a*.

Figure 21:
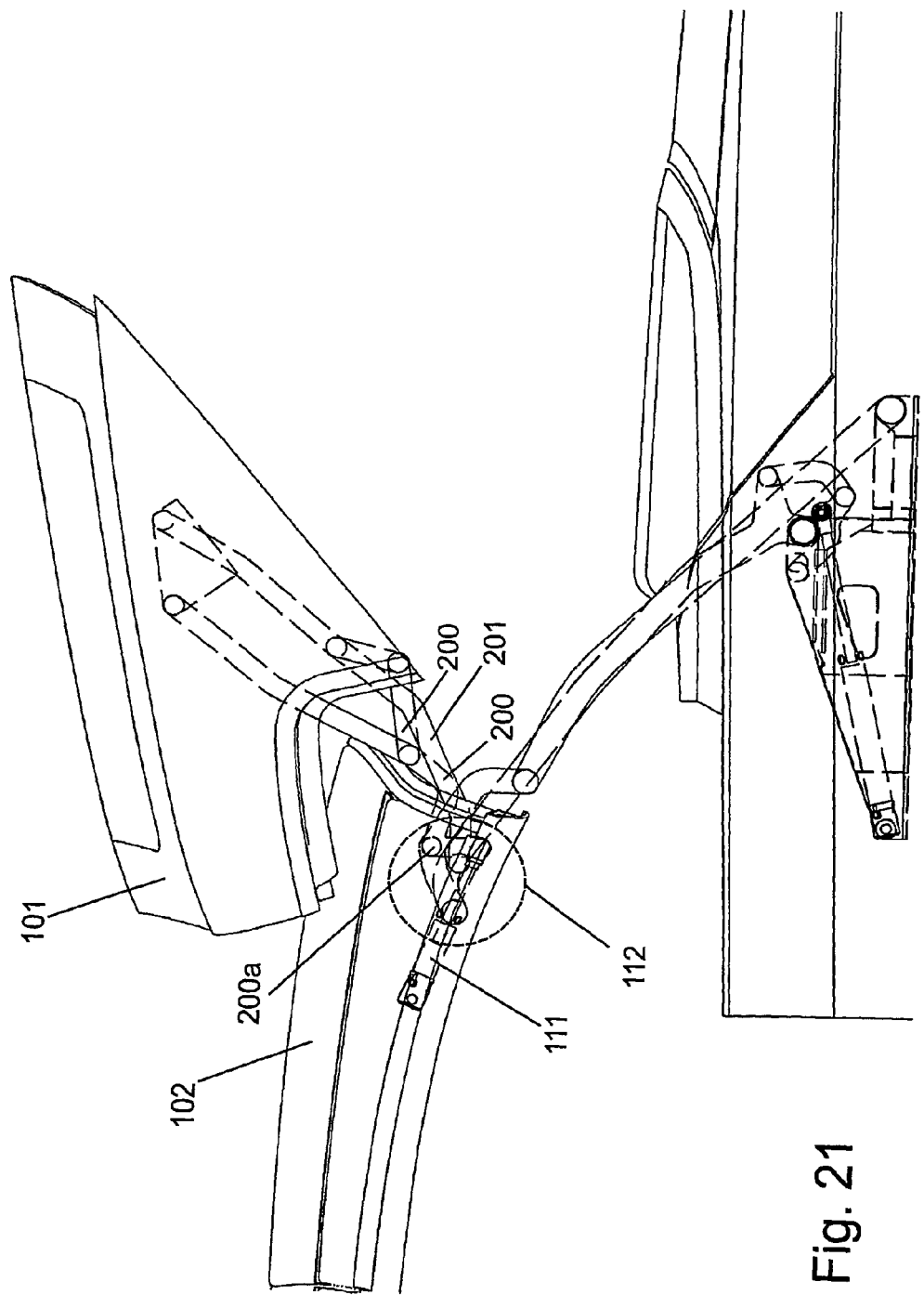
FIG. 21 shows the folding top from FIG. 20 in a first step of a folding-top opening movement.
Figure 22:
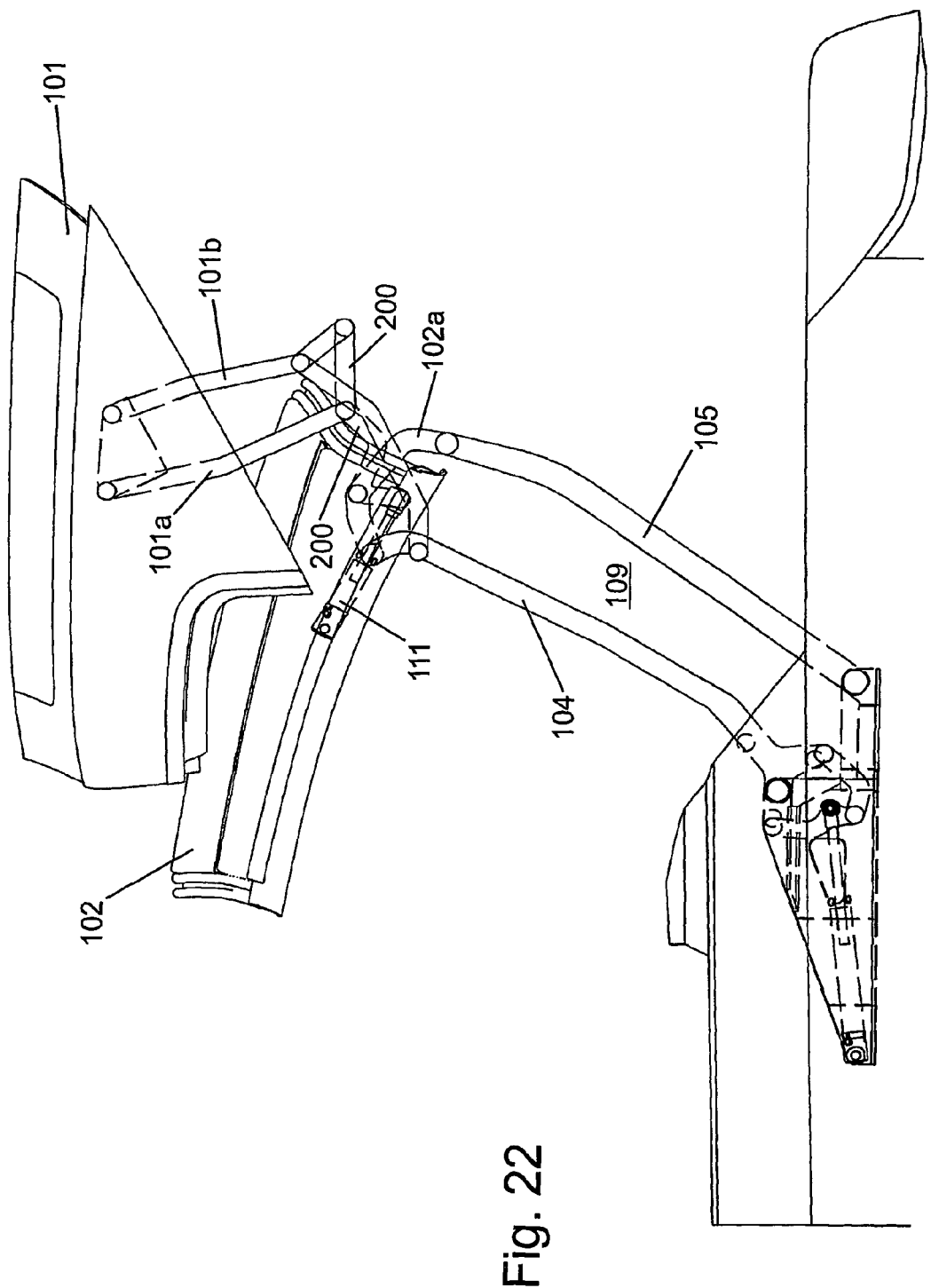
FIG. 22 shows the folding top from FIG. 20 in a second step of a folding-top opening movement.
Figure 23:
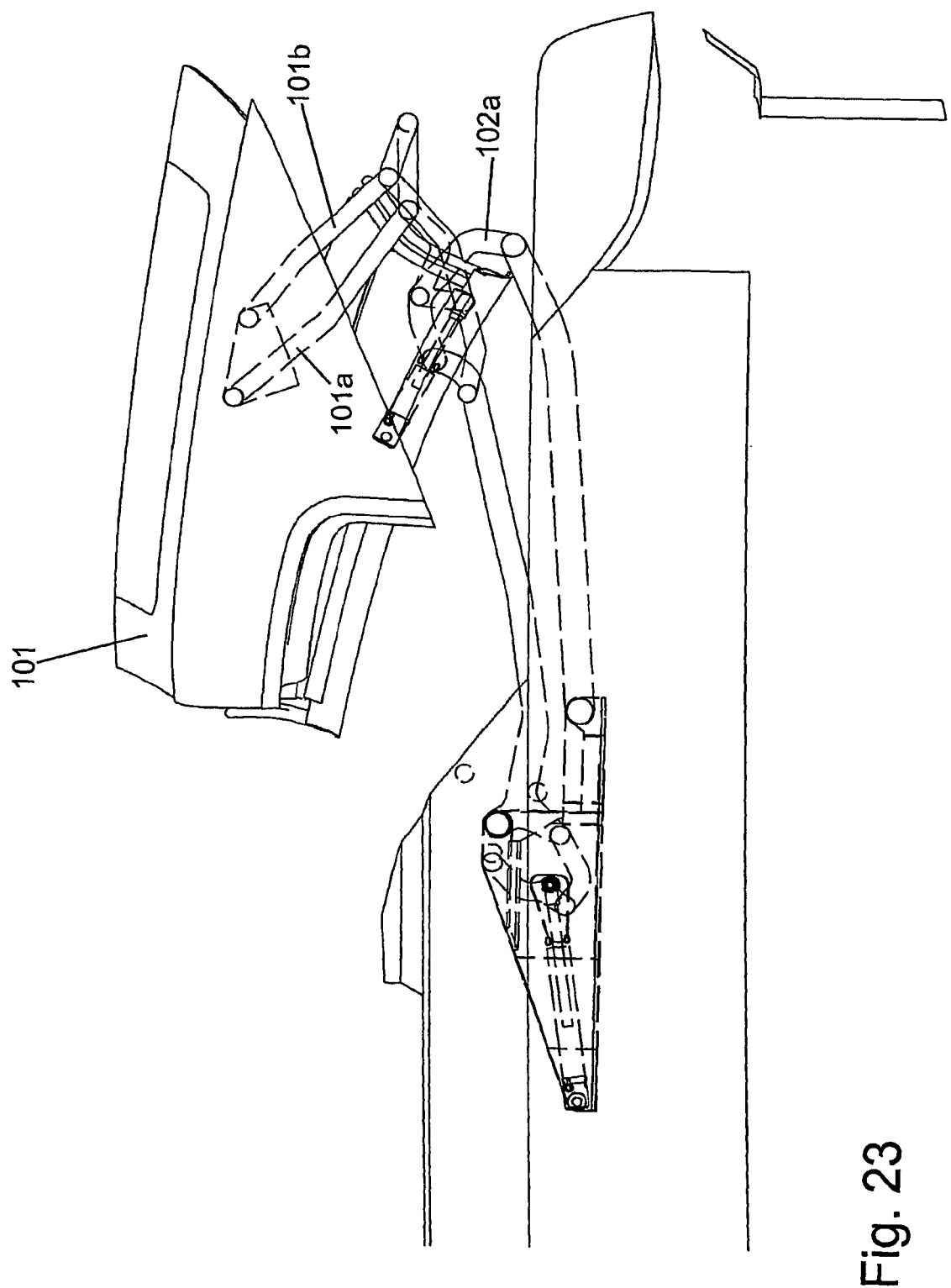
FIG. 23 shows the folding top from FIG. 20 in a third step of a folding-top opening movement.
Figure 24:
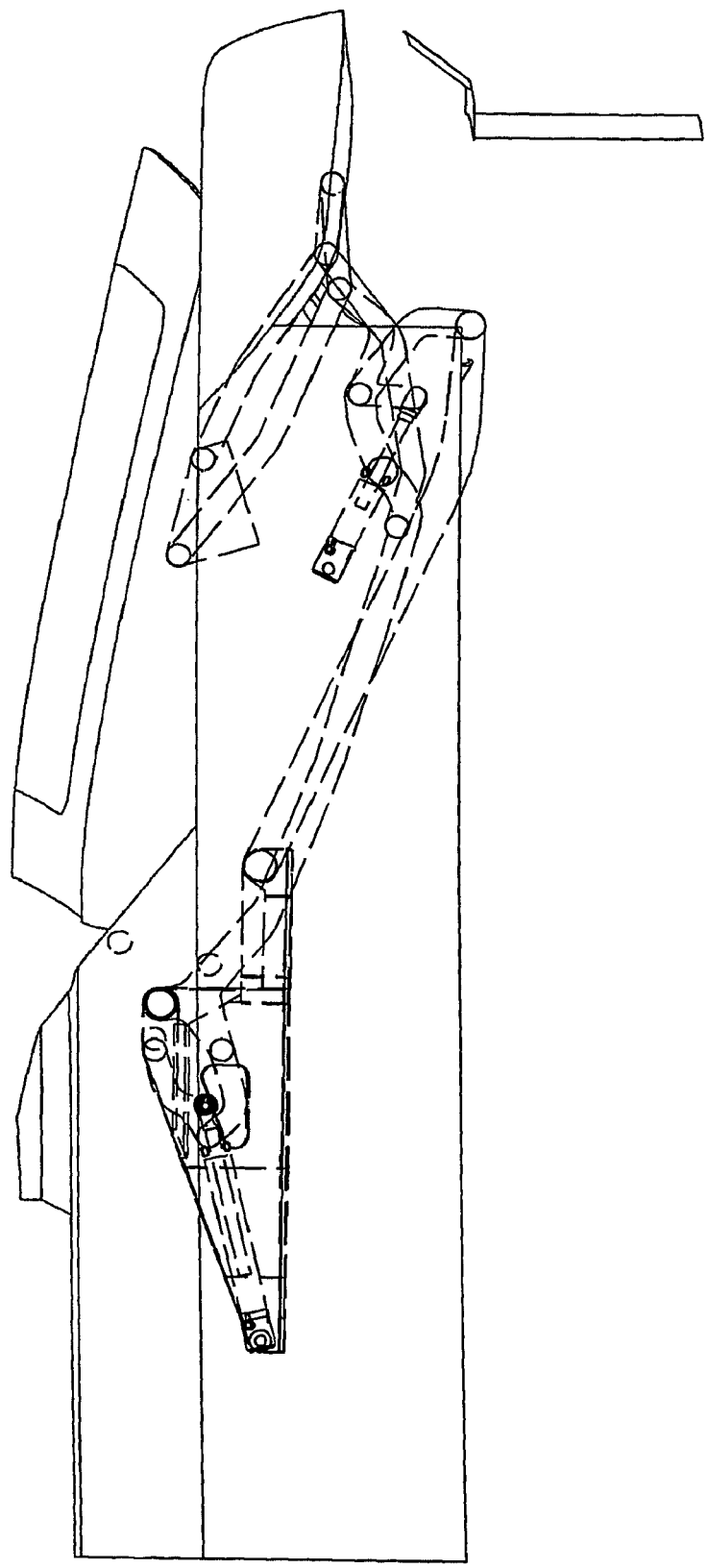
FIG. 24 shows the folding top from FIG. 20 in a state in which it has been opened fully and stowed in a rear region of the vehicle.

This results, in the first instance (FIG. 21), essentially in the first roof part 101 pivoting open in the direction of travel about an imaginary axis of rotation 112, which is arranged approximately at a rear end of the second roof part 102. In FIG. 21, the position of the imaginary axis of rotation 112 is localized by a dashed circular line. It should be noted here that the rotation about the axis of rotation 112 is merely a rotary movement in an approximate sense. In particular, it is not precisely a case of the base link 200 rotating about the rotary articulation 200*a*. Rather, as a result of an additional opening of the roof-part four-bar mechanism 101*c*, albeit only insignificantly in this first stage of the folding-top opening movement, the roof part 102, in the first instance, executes a combination of a rotary movement and a pivoting movement. On account of the small amount of pivoting movement, this may also be regarded as rotary movement about an axis of rotation 112 which can be changed in position to a slight extent.

This avoids the situation where the first roof part 101, in the first instance, is pivoted over the second roof part 102, which gives rise to an esthetically pleasing movement sequence without the roof parts 101, 102, 103 forming a stack.

The third roof part 103 is displaced over the second roof part 102 via a linear guide, although, in respect of its height, it remains beneath the lowermost edge of the pivoted-open first roof part 101.

Furthermore, with the first roof part 101 pivoted open, a rear element 110 is pivoted open counter to the direction of travel, in a manner analogous to the first exemplary embodiment described, for the purpose of stowing the folding top, it being possible, without any further measures being required, for the front region of the rear element 110, this region forming a rear-window shelf when the folding top is closed, to be pivoted past the pivoted-open first roof part 101.

As the folding-top opening movement continues (FIGS. 22 to 24), the main four-bar mechanism 109 is then pivoted by means of a force-introduction unit 106a, the above-described positive control means also giving rise to a further movement of the first roof part relative to the second roof part. This results in a flowing folding-top opening movement in which the three roof parts 101, 102 and 103 only form a stack immediately prior to the roof parts being lowered all the way (see, for example, FIG. 17) into the rear region of the vehicle. In particular, there is continuous movement of the first roof part 101 relative to the second roof part 102, this being brought about, as described above, by the main four-bar mechanism 109 being coupled to the roof-part four-bar mechanism 101 c via the control link 201.

A third exemplary embodiment of a folding top according to the invention is described hereinbelow:

The third preferred exemplary embodiment of a folding top according to the invention comprises a third, front roof part 301, a first, rear roof part 302 and a second, central roof part 310 which, in the closed state, is arranged between the first and the third roof parts 301, 302. The central roof part 310 is fixed to a central link 310a, with the result that the central roof part 310 and the central link 310a may be regarded as a structural unit.

The third roof part 301 is connected to the central roof part 310 via a front four-bar mechanism 311, a front link 311b of the front four-bar mechanism being connected in an articulated manner to the central link 310a, and an outside link 311a of the front four-bar mechanism 311 being articulated on the central roof part 310 from the outside. In the closed state according to FIGS. 25, 26 and 35, the outside link is aligned adjacent the outside of the central roof part 310, the outside link being located in a drip-molding or rain-channel recess of the central roof part 310.

The second, rear roof part 302 is articulated on the central link 310a by means of a rear four-bar mechanism 312. The rear roof part 302 comprises C-pillars of the folding top and a solid rear window. The rear four-bar mechanism 312 comprises a first rear link 312a and a second rear link 312b.

Overall, the third roof part 301 and the first roof part 302 can thus be pivoted over the central roof part 310 in each case, it being possible for the rear roof part 302 additionally to be pivoted over the front roof part 301.

The front four-bar mechanism 311 and the rear four-bar mechanism 312 are connected to one another via drivable positive control means 304, with the result that a position of the third roof part 301 is associated, in mechanical terms, with a position of the first roof part 302 in a one-to-one correspondence.

The positive control means 304 comprises a first linkage 308, which activates the front four-bar mechanism 311, a second linkage 309, which activates the rear four-bar mechanism 312, and a rotary link 307. The rotary link is connected to the central link 310a such that it can be rotated at a first articulation 7a. The rotary link 307, in addition, can be rotated for driving action by means of a force-introduction unit 305, which is designed as a linear hydraulic cylinder and is supported against the central link 310a. In this case, the rotary link is designed as a three-arm link. However, it is also possible, in particular, for a rotary link to be understood, in the sense of the invention, as a rotary plate or control plate. In particular a universally usable perforated plate can also be utilized as a control plate, with the result that, by virtue of articulations being fitted in a variable manner on the perforated plate, it is possible, using standard components, to provide a delay-control means which can be adapted to different folding tops.

The first linkage 308 comprises a first, front control link 308a and two front links 308b, 308c, it being possible to achieve a particularly large pivoting angle for the front four-bar mechanism 311 by virtue of the front link 311b being connected to the first control link 308a by means of the two front links 308b, 308c. The first control link 308a is connected to the rotary link 307 at a second articulation 307b of the rotary link 307.

The second linkage 309 comprises a second, rear control link 309a, which is guided in relation to the central link 310a via a small supporting link 309b. The second control link 309a is articulated on an extension of the second rear link 312b, with the result that the rear four-bar mechanism 312 is articulated on the second control link 309a and can be activated via the latter.

The central roof part 310 or the central link 310a is connected to a bodywork-mounted main-bearing unit 314 via a main-link mechanism 313 designed as a main four-bar mechanism 313, the main four-bar mechanism 313 comprising a first main link 313a and a second main link 313b.

A rear stowage region 316 of the vehicle can be covered over by means of a rear element 315, it being possible for the rear element 315 to be pivoted open counter to the direction of travel in order to release a through-passage space for the folding top which is to be stowed.

Figure 39:
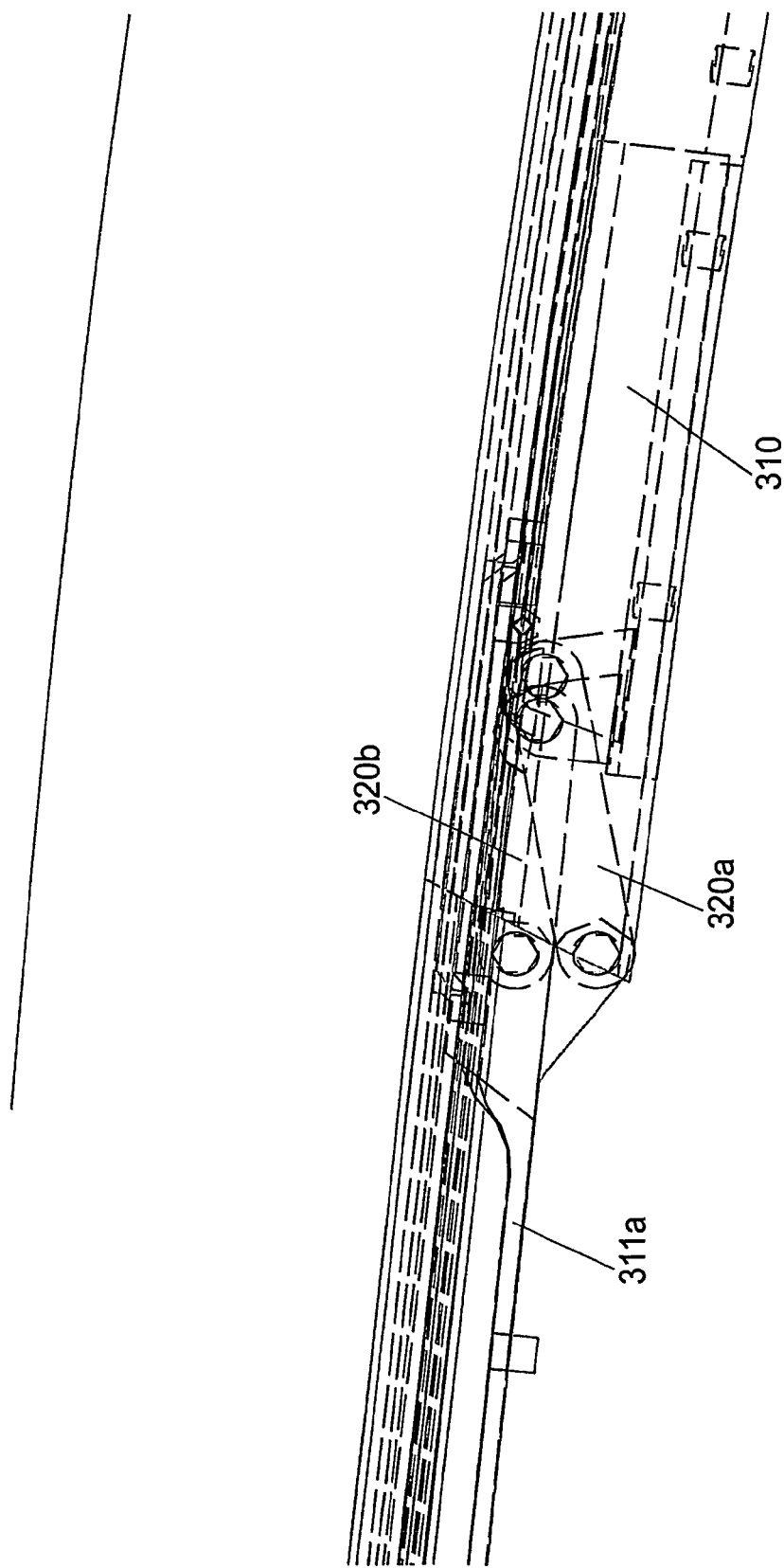
FIG. 39 shows a view, in detail form, of an outside link of the third exemplary embodiment of a folding top according to the invention in a closed position.
Figure 40:
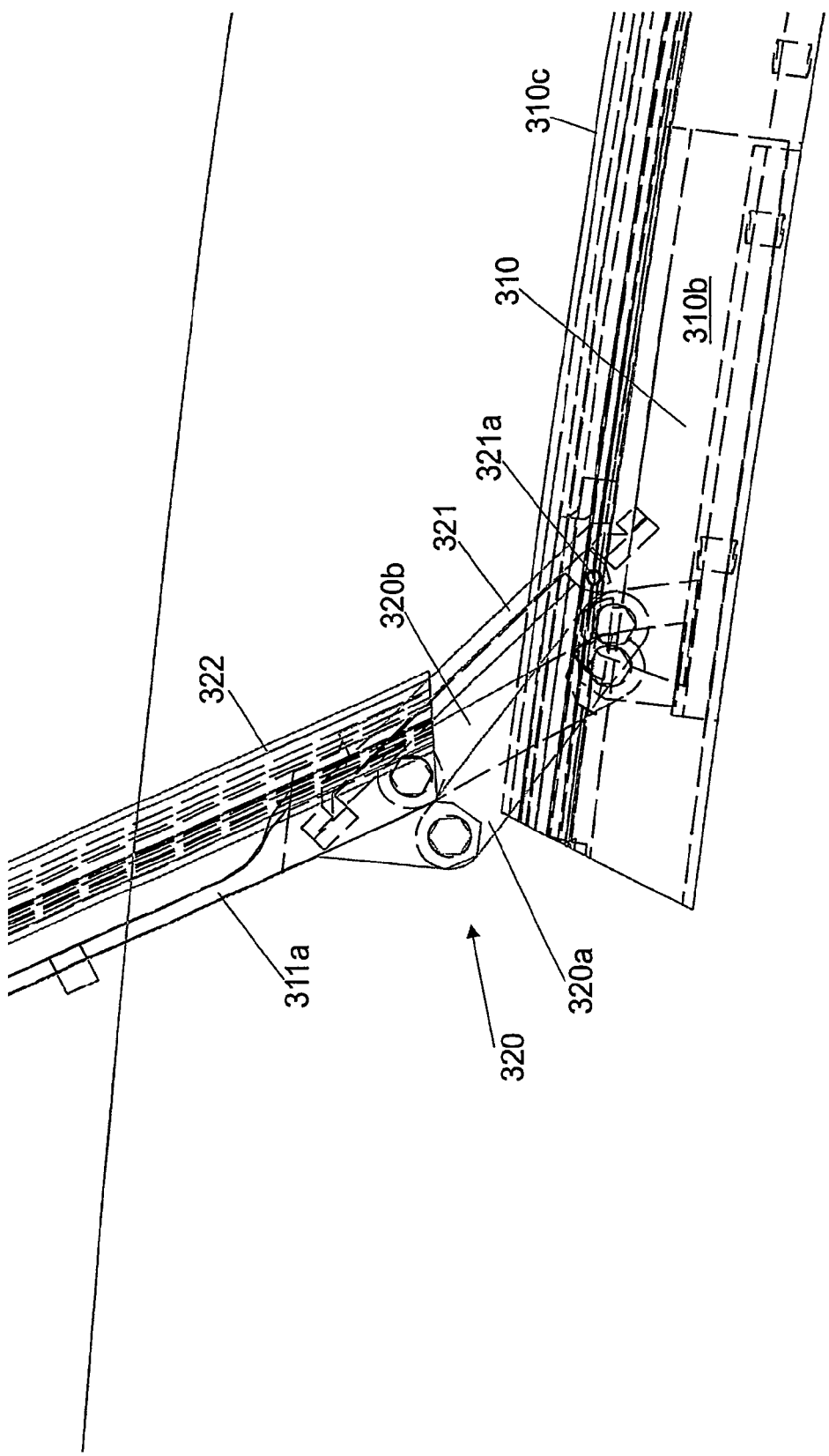
FIG. 40 shows the view, in detail form, from FIG. 39 in a partially open position.

As a particularly advantageous detailed solution for the folding top according to the invention which is shown, in particular, in FIGS. 39 to 41, the outside link 311 a is not articulated on the central roof part 310 via a conventional rotary articulation. Rather, the articulation arrangement comprises a small four-bar mechanism 320, the central roof part 310 forming the base of the small four-bar mechanism 320 and the outside link 311a forming the connecting rod of the small four-bar mechanism 320. A first link 320a and a second link 320b of the small four-bar mechanism 320 cross over one another. A short covering plate 321 can be pivoted along essentially parallel to the links 320a, 320b of the small four-bar mechanism 320 about a separate articulation arrangement 321a, the covering plate 321 being guided with sliding action in the region of its end located opposite its articulation arrangement 321a.

In the case of a link being configured as an outside link, account should be taken of a series of special features. As is also the case in the exemplary embodiment shown, an outside link 311a is advantageously arranged in a roof-rail recess 310b, which is provided in any case in most modern folding vehicle tops. The roof-rail recess 310b is covered with a roof-rail covering 310c outside the region of the link 310a. The outside link 311a expediently comprises a corresponding link-cover 322 positioned on the actual link, with the result that, when the folding top is closed, the link is able to give the appearance of a continuous roof rail 310c, 322. Such an arrangement, however, is accompanied by the problem that, on account of being accommodated in a sunken manner in the roof-rail recess 310b, the link 311a would strike against the roof-rail covering 310c during a pivoting movement, at least when a large pivoting angle of the link 311a is necessary. As a result of the advantageous detailed solution for the articulation arrangement of the link in the small four-bar mechanism 320, however, the link 311a, together with its roof-rail cover 322, passes out of the roof-rail recess 310b over its entire length even as it begins to pivot, with the result that a particularly large pivoting angle is made possible. FIGS. 39 to 41 show that a free pivoting angle of the outside link of more or less 180 degrees is thus made possible.

The short covering plate 321, which can be pivoted along with the four-bar mechanism 320, merely serves for covering over the roof-rail region above the small four-bar mechanism 320 when the folding top is closed.

It should be mentioned that the prior art has disclosed solutions in which a recessed, outside link can be covered by means of a strip-like flap which is fitted in a pivotable manner on a roof part and forms a cover of a roof-rail recess. In contrast, the solution described has considerable advantages since, for example, the cover of the roof-rail recess can be secured directly on the link.

Figure 25:
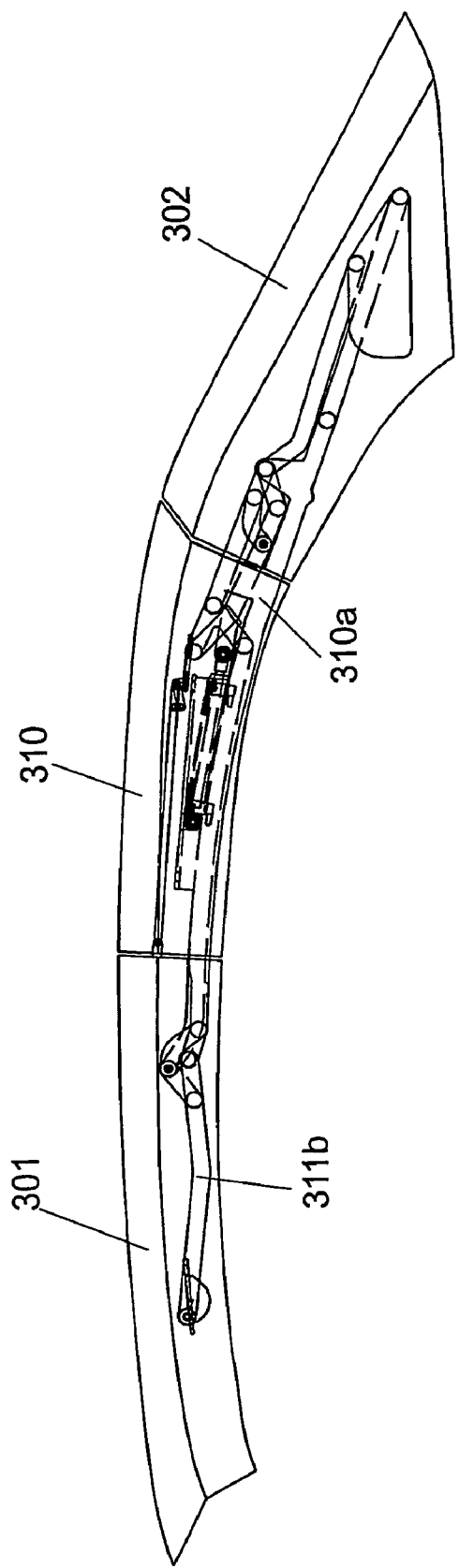
FIG. 25 shows a schematic partial view, from the side, of a third exemplary embodiment of a folding top according to the invention in a closed position.
Figure 26:
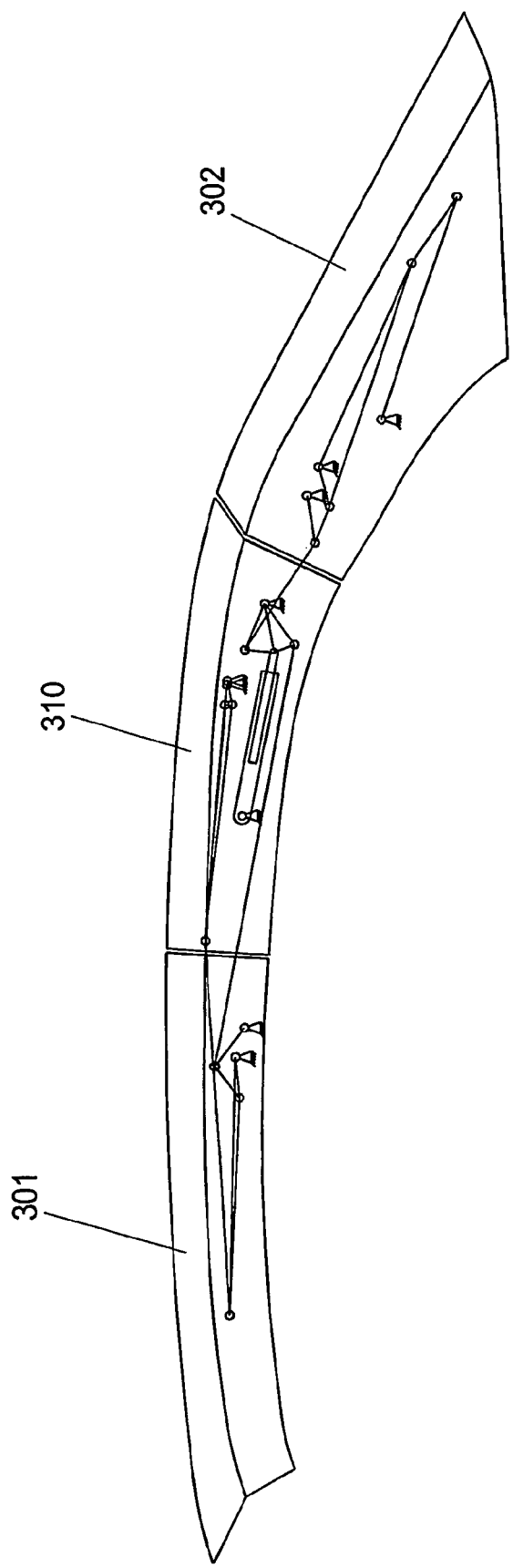
FIG. 26 shows the folding top from FIG. 25 in a basic illustration depicting the interaction of the components.
Figure 27:
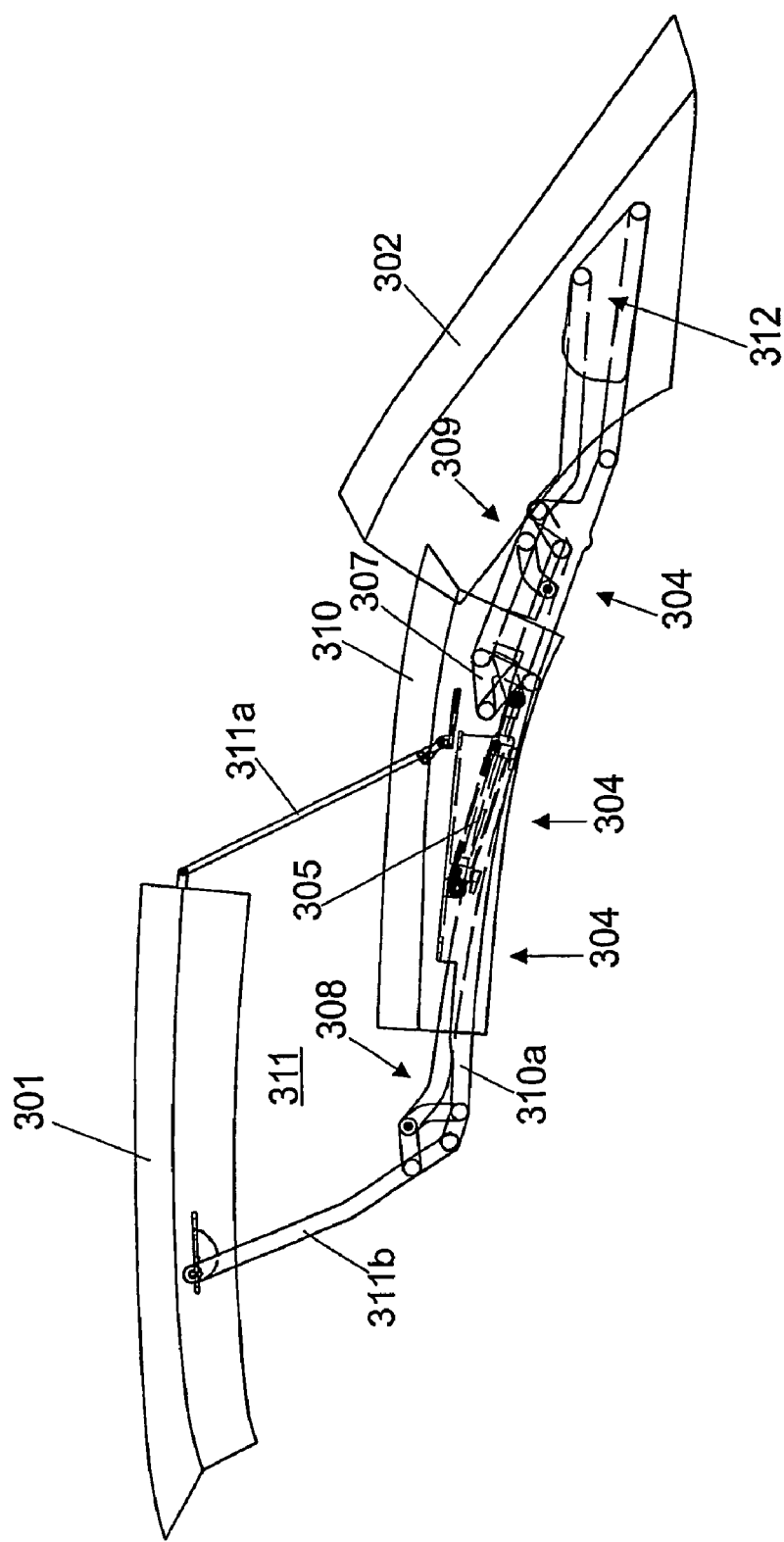
FIG. 27 shows a schematic partial view, from the side, of a third exemplary embodiment of a folding top according to the invention in a first step of an opening movement.
Figure 28:
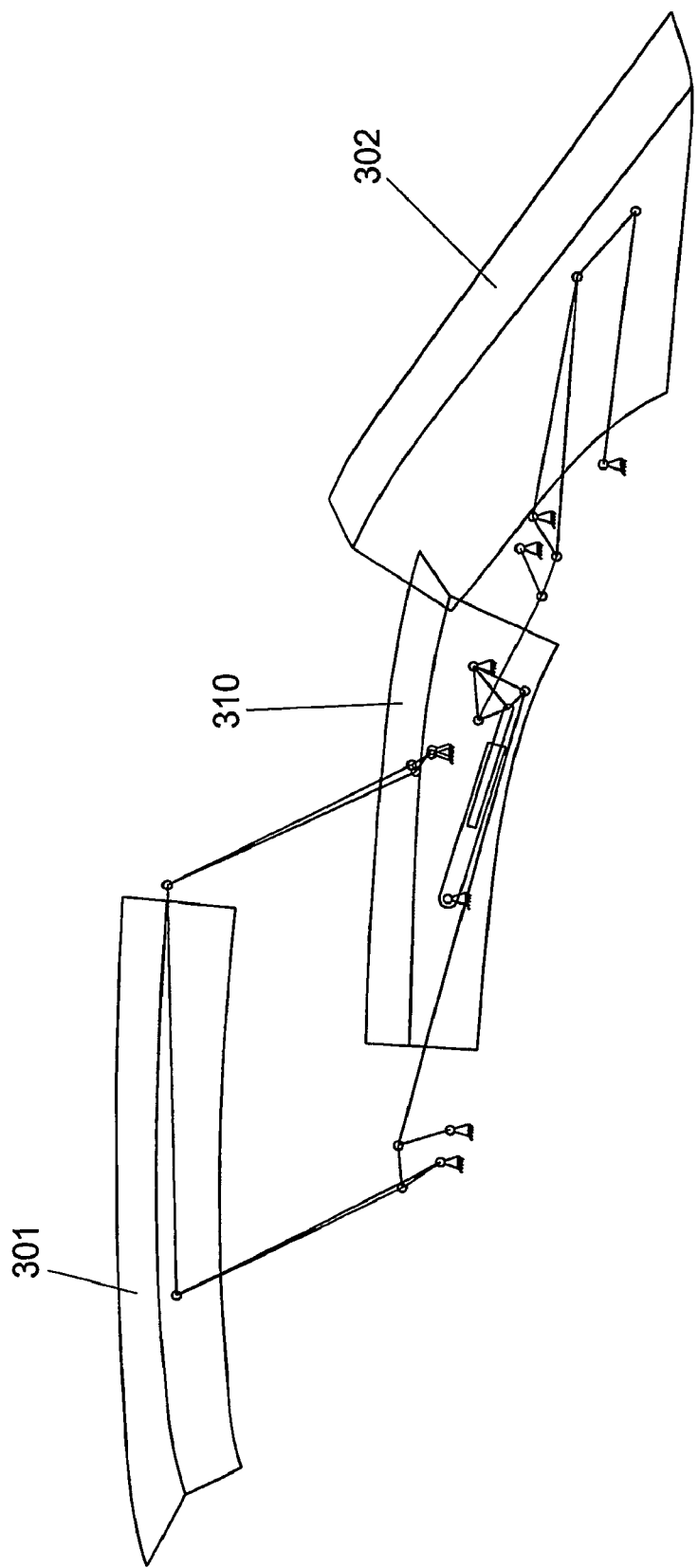
FIG. 28 shows the folding top from FIG. 27 in a basic illustration depicting the interaction of the components.
Figure 34:
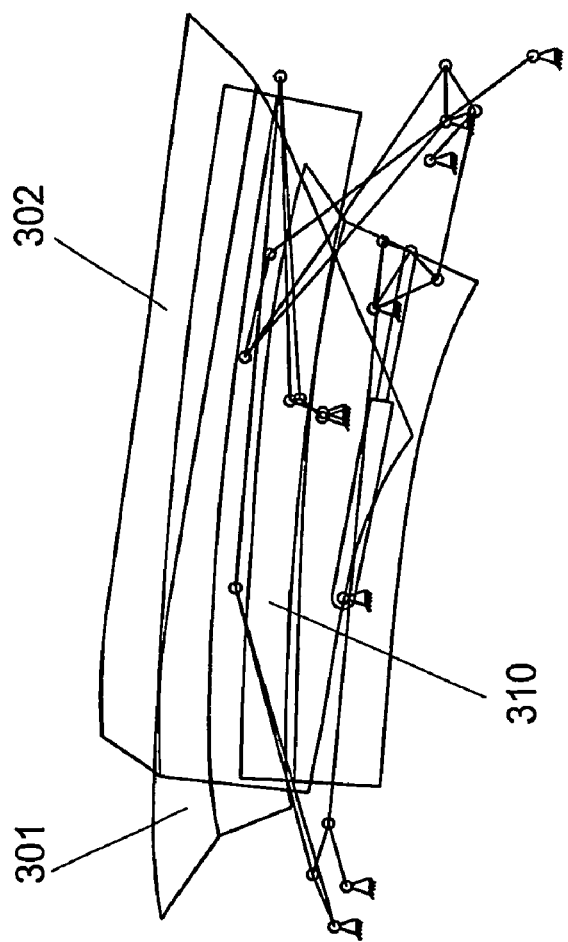
FIG. 34 shows the folding top from FIG. 33 in a basic illustration depicting the interaction of the components.
Figure 35:
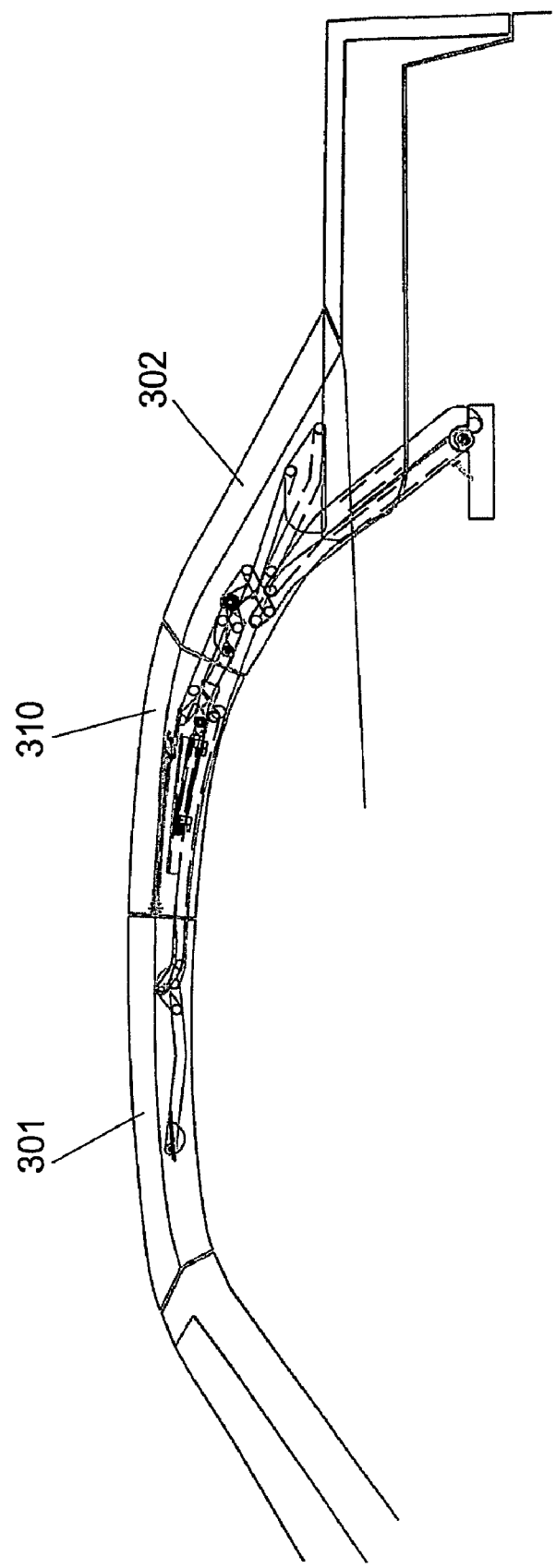
FIG. 35 shows a lateral overall view of the folding top from FIG. 25.

The invention functions, then, as follows:

Starting from the closed state of the folding top according to FIGS. 25, 26 and 35, in the first instance, a first part of a folding-top opening movement is initiated. The force-introduction unit 305 is actuated for this purpose, as a result of which the rotary link 307 is rotated, according to the illustrations, in the counterclockwise direction. A comparison of FIGS. 25 to 34 clearly shows that, in the first instance here, it is predominantly the first linkage 308 which is actuated by the rotary link 307, whereas, on account of the position of the third articulation 307c in relation to the second linkage 309, the second linkage 309 is barely actuated in the first instance, in particular in the relevant longitudinal direction of the second, rear control link 309a.

Figure 29:
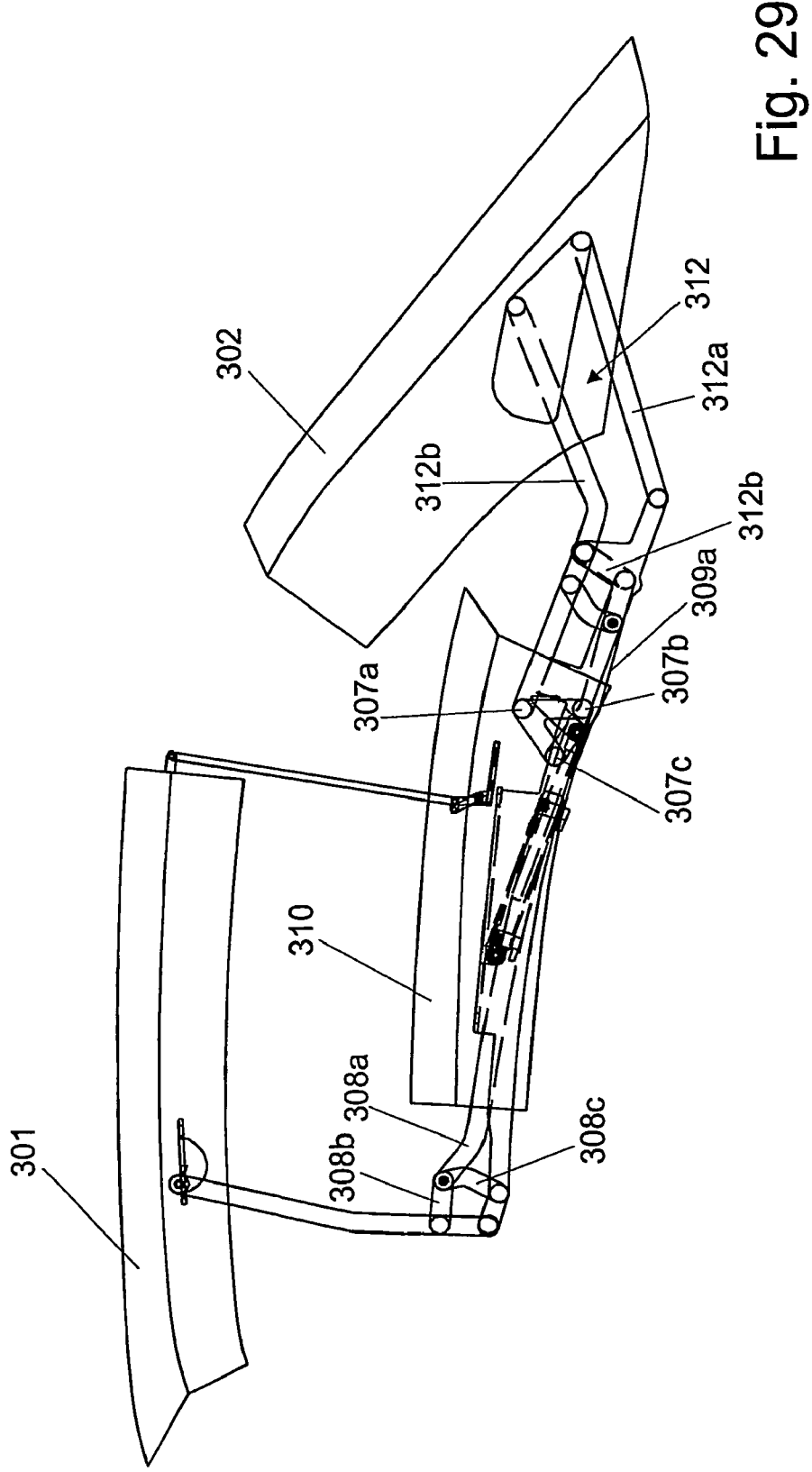
FIG. 29 shows a schematic partial view, from the side, of a third exemplary embodiment of a folding top according to the invention in a second step of an opening movement.
Figure 30:
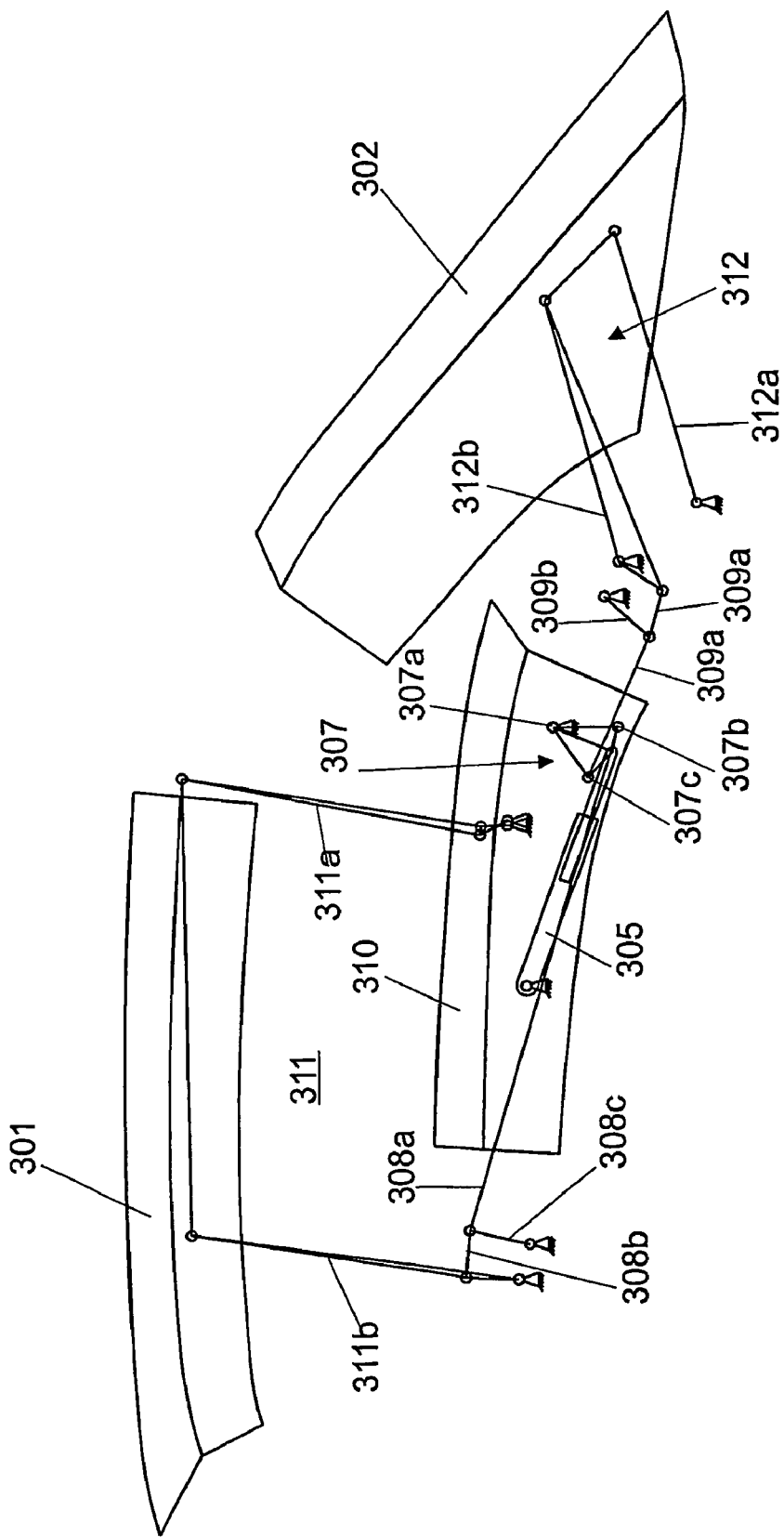
FIG. 30 shows the folding top from FIG. 29 in a basic illustration depicting the interaction of the components.
Figure 31:
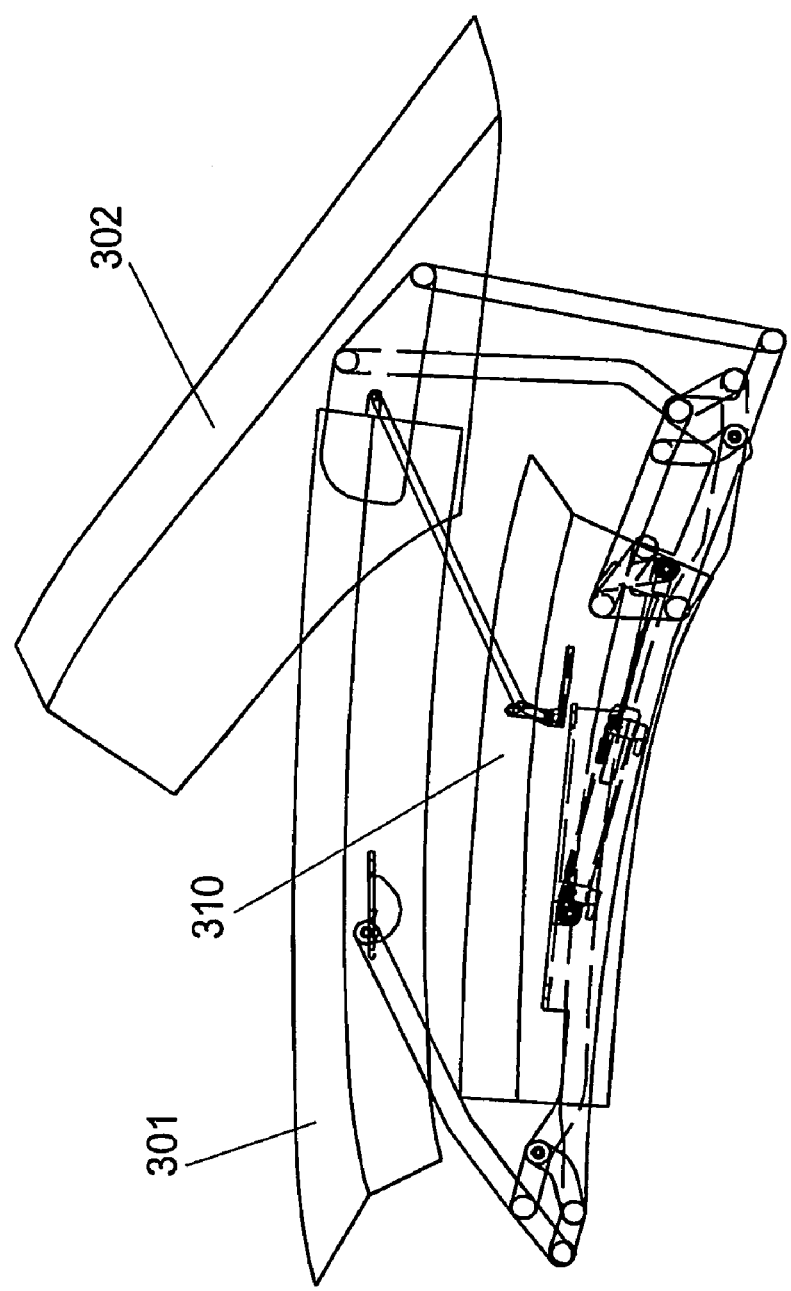
FIG. 31 shows a schematic partial view, from the side, of a third exemplary embodiment of a folding top according to the invention in a third step of an opening movement.
Figure 32:
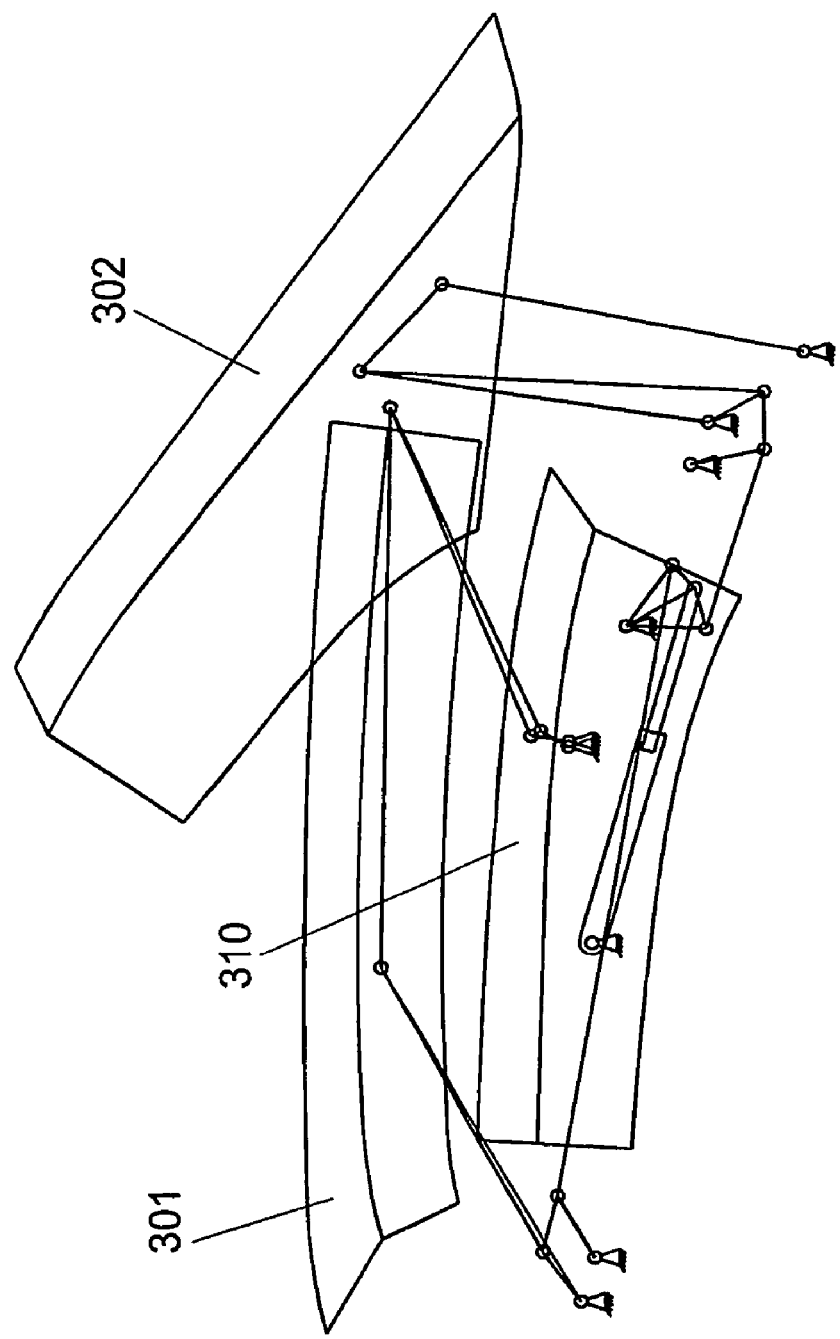
FIG. 32 shows the folding top from FIG. 31 in a basic illustration depicting the interaction of the components.

In the first instance, it is thus predominantly the case that the front roof part 301 pivots over the central roof part 310. The pivoting of the front roof part 301 prevails in the movement sequence approximately up to the position which is illustrated in FIGS. 29 and 30.

The relative movement of the front roof part 301, which has already been pivoted to a significant extent over the central roof part 310, subsequently slows down. At the same time, the movement of the rear roof part 302 increases since (for example from the position which is shown in FIGS. 29 and 30) a very direct conversion of the rotary movement of the rotary link 307 into a longitudinally directed movement of the rear control link 309a then takes place. The above-described movement sequence of the two roof parts may thus be referred to as quasi-sequential.

Figure 33:
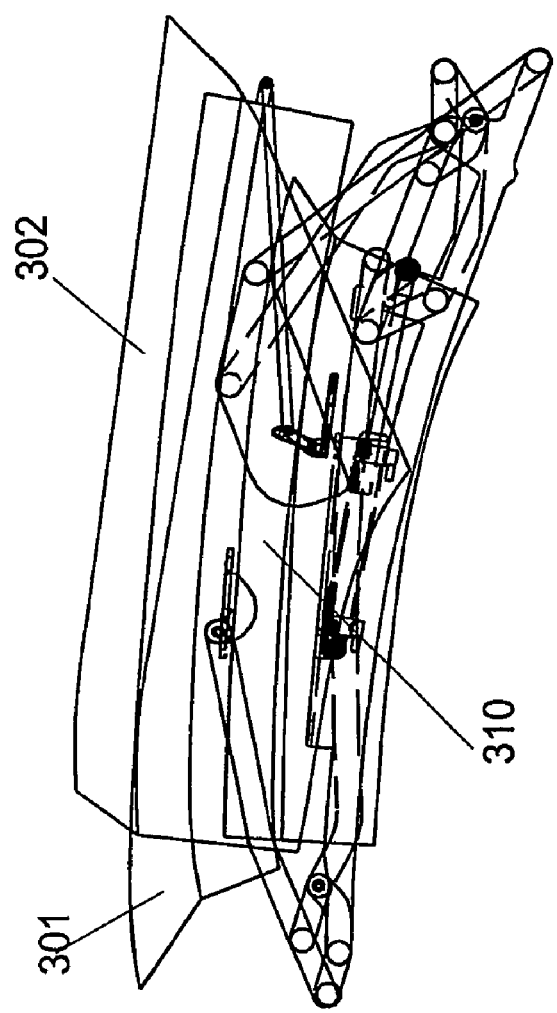
FIG. 33 shows a schematic partial view, from the side, of a third exemplary embodiment of a folding top according to the invention in a fourth step of an opening movement.

The first part of the folding-top opening movement is at an end when the three roof parts 301, 302 and 310 are arranged entirely in the form of a stack (see FIGS. 33, 34 and 36).

Figure 37:
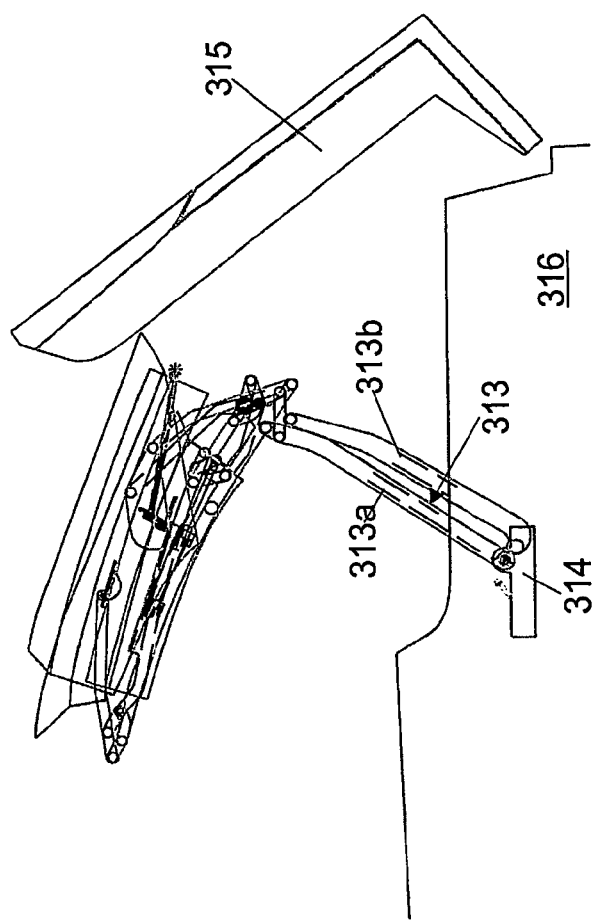
FIG. 37 shows the folding, top from FIG. 36 in a further step of an opening movement.

A second part of the folding-top opening movement is illustrated in the overall views of the folding top according to FIGS. 36 to 38. In this case, pivoting of the main-link mechanism 313 driven by a second drive device displaces the previously formed stack of roof parts 301, 302, 310 into a rear stowage region 316 of the vehicle. For this purpose, the rear element 315 is first of all pivoted open counter to the direction of travel and then pivoted closed again.

The invention claimed is:

1. A folding top for a cabriolet vehicle, comprising:
 a first roof part resting upon an openable rear element of the vehicle in a closed state of the folding top and capable of being raised up from the rear element;
 a second roof part mounted pivotably on the vehicle and disposed in front of the first roof part relative to a direction of travel in the closed state of the folding top; and
 a third roof part including a hard shell part extending transversely to the direction of travel over an entire width of the vehicle, the third roof top being disposed in front of the second roof part in the closed state of the folding top, wherein the first roof part is disposed above the second roof part in an open state of the folding top and wherein the third roof part is displaceable to a position over the second roof part.

2. The folding top as claimed in claim 1, further comprising a positive control means connecting the third roof part and the first roof part.

3. The folding top as claimed in claim 1, wherein the first roof part is mounted in a movable manner on the second roof part.

4. A folding top for a cabriolet vehicle, comprising:
 a first roof part resting upon an openable rear element of the vehicle in a closed state of the folding top and capable of being raised up from the rear element;
 a second roof part mounted pivotably on the vehicle and disposed in front of the first roof part relative to a direction of travel in the closed state of the folding top;
 a third roof part disposed in front of the second roof part in the closed state of the folding top, wherein the first roof part is disposed above the second roof part in an open state of the folding top; and
 a positive control means connecting the third roof part and the first roof part.

5. The folding top as recited in claim 4, wherein the first roof part is mounted in a movable manner on the second roof part.

6. A folding top for a cabriolet vehicle, comprising:
 a first roof part resting upon an openable rear element of the vehicle in a closed state of the folding top and capable of being raised up from the rear element;
 a second roof part mounted pivotably on the vehicle and disposed in front of the first roof part relative to a direction of travel in the closed state of the folding top, wherein the first roof part is mounted in a movable manner on the second roof part; and
 a third roof part disposed in front of the second roof part in the closed state of the folding top, wherein the first roof part is disposed above the second roof part in an open state of the folding top.

7. The folding top as recited in claim 1, wherein the third roof part is disposed above the second roof part and the first roof part is disposed above the third roof part when the folding top is in an open position.

8. The folding top as recited in claim 1, wherein the rear element is pivotable to an open position in a direction counter to the direction of travel.

9. The folding top as recited in claim 1, wherein the first roof part is raised up from the rear element in a first stage of a folding-top opening movement.

10. The folding top as recited in claim 1, wherein the first roof part rests on the rear element with sealing action from above in the closed state of the folding top.

11. The folding top as recited in claim 1, wherein the third roof part is capable of being pivoted essentially parallel over the second roof part.

12. The folding top as recited in claim 1, wherein the third roof part is releasably securable on a windshield frame of the vehicle in the closed state of the folding top.

13. The folding top as recited in claim 1, further comprising a coupling link fixed to the second roof part, a first roof-part link, and a second roof-part link, wherein the first roof part is articulated, by means of the first roof-part link and the second roof-part link, on the coupling link (2a), and wherein the first roof part, the first roof-part link, the second roof-part link, and the coupling link form a roof-part four-bar mechanism.

14. The folding top as recited in claim 13, further comprising a drive device configured to pivot the roof-part four-bar mechanism relative to the second roof part for driving action.

15. The folding top as recited in claim 13, further comprising a first front link and a second front link, wherein the third roof part is connected in an articulated manner to the coupling link via the first front link and the second front link, a front four-bar mechanism being formed by the coupling link, the first front link, the second front link, and the third roof part.

16. The folding top as recited in claim 15, further comprising a control link connecting the front four-bar mechanism and the roof-part four-bar mechanism to one another in an articulated manner so that a first positively controlled link chain is formed by the front four-bar mechanism, the roof-part four-bar mechanism and the control link.

17. The folding top as recited in claim 16, wherein the first positively controlled link chain is configured to force the first roof part and the third roof part to move in opposite directions relative to each other.

18. The folding top as recited in claim 1, further comprising a main-bearing unit mounted to a bodywork of the vehicle, a first main link and a second main link, each connected in an articulated manner to the main-bearing unit, and wherein the second roof part is connected to the first main link and the second main link in an articulated manner so as to form a main-link mechanism, the main-link mechanism forming a second positively controlled link chain.

19. The folding top as recited in claim 18, further comprising a force-introduction unit, wherein the main-link mechanism is pivotable for driving action using the force-introduction unit.

20. The folding top as recited in claim 1, wherein the first roof part includes a solid rear window.

21. The folding top as recited in claim 1, wherein the first roof part capable of being be pivoted up in the direction of travel about an axis of rotation defined in a rear end region of the second roof part.

22. The folding top as recited in claim 21, further comprising a drivable base link mounted in a movable manner on the second roof part.

23. The folding top as recited in claim 22, further comprising a first roof-part link and a second roof-part link and wherein the base link, the first roof part, the first roof-part link and the second roof-part link form a roof-part four-bar mechanism with the base link forming a base of the roof-part four-bar mechanism and the first roof part forming the connecting rod of the roof-part four-bar mechanism.

24. The folding top as recited in claim 23, further comprising a main link and a control link connecting one of the first and second roof-part links in an articulated manner to the main link.

25. The folding top as recited in claim 21, further comprising a sliding guide and wherein the third roof part is mounted on the second roof part using the sliding guide.

26. The folding top as recited in claim 1, further comprising a positive control means including a mechanical control device, the first roof part and the third roof part capable of being moved relative to one another using the positive control means, and wherein the control device is capable of delaying a movement of the third roof part and of the first roof part relative to one another.

27. The folding top as recited in claim 26, further comprising a common force-introduction unit configured to drivably move the first roof part and the third roof part via the positive control means.

28. The folding top as recited in claim 27, wherein the control device includes comprises a rotary link.

29. The folding top as recited in claim 28, wherein in that the rotary link is driveable using the force-introduction unit.

30. The folding top as recited in claim 29, further comprising a first linkage connecting the rotary link to the third roof part and a second linkage connecting the rotary link to the first roof part.

31. The folding top as recited in claim 26, further comprising a front four-bar mechanism connecting the third roof part to the second roof part and a rear four-bar mechanism connecting the first roof part the second roof part.

32. The folding top as recited in claim 31, further comprising a main-link mechanism connecting the second roof part to a bodywork of the vehicle.

33. The folding top as recited in claim 31, wherein the front four-bar mechanism includes an outside link aligned adjacent an outside of the second roof part in the closed state of the folding top.

34. The folding top as recited in claim 33, further comprising a small four-bar mechanism connecting the outside link to the second roof part.

35. The folding top as recited in claim 26, wherein the control device includes a rotatable control plate.

36. The folding top as recited in claim 1, further comprising a positively controlled link chain for mounting the second roof part in a pivotable manner on the vehicle in the closed state of the folding top.

* * * * *